United States Patent [19]

Sato et al.

[11] Patent Number: 5,379,301

[45] Date of Patent: Jan. 3, 1995

[54] MICROPROCESSOR FOR DEBUGGING PROGRAMS

[75] Inventors: Koichi Sato; Koji Hirano; Kazunori Saitoh, all of Itami, Japan

[73] Assignee: Mitsubishi Denki Kabushiki Kaisha, Tokyo, Japan

[21] Appl. No.: 151,246

[22] Filed: Nov. 12, 1993

[30] Foreign Application Priority Data

Nov. 20, 1992 [JP] Japan .................. 4-311636

[51] Int. Cl.$^6$ ..................... G06F 11/00; G06F 11/28
[52] U.S. Cl. ..................... 371/19; 364/DIG. 1; 364/DIG. 2; 364/264; 364/264.1; 364/264.3; 364/265; 364/265.6; 364/267; 364/267.2; 364/267.6; 364/267.91
[58] Field of Search .......... 364/DIG. 1, DIG. 2; 395/375, 500, 575, 800; 371/19

[56] References Cited

U.S. PATENT DOCUMENTS

| | | | |
|---|---|---|---|
| 4,571,677 | 2/1986 | Hirayama et al. | 371/19 |
| 4,635,193 | 1/1987 | Moyer et al. | 371/19 |
| 5,067,073 | 11/1991 | Andrews | 395/375 |
| 5,121,489 | 6/1992 | Andrews | 371/19 |

*Primary Examiner*—Robert B. Harrell
*Attorney, Agent, or Firm*—Lowe, Price, LeBlanc & Becker

[57] ABSTRACT

A microprocessor, comprising a register 18 for setting either a first mode in which a trap instruction is not executed, or a second mode in which the trap instruction can be executed is set, wherein an instruction decoding circuit 23, in case of operating in the first mode, outputs an internal signal SG1 directing execution of a subroutine call, when decoding a subroutine call instruction, to an instruction executing unit 14, and in case of operating in the second mode, outputs the internal signal SG1 directing execution of a trap when decoding the subroutine call instruction, to the instruction executing unit 14. By such a configuration, a break can be effected in a unit of subroutine under a simple control when debugging the program, and by enabling the breaking without decoding a program to be debugged, the debugging can be effected efficiently under a real time environment.

8 Claims, 18 Drawing Sheets

Fig. 2
Prior Art

| ADDRESS | DATA | INSTRUCTION LENGTH |
|---|---|---|
| ⋮ | ⋮ | |
| A1 | INSTRUCTION D1 | L1 |
| A2 | INSTRUCTION D2 | L2 |
| A2 | INSTRUCTION D3 | L3 |
| ⋮ | ⋮ | |

Fig. 5
Prior Art

| ADDRESS | DATA | | ADDRESS | DATA |
|---|---|---|---|---|
| : | : | | : | |
| A1 | SUBROUTINE CALL INSTRUCTION D1 | → | | SUBROUTINE S1 |
| | | S1A1 → | | INSTRUCTION S1D1 (CONSECUTIVE INSTRUCTION) |
| | | : | | : (CONSECUTIVE INSTRUCTION) |
| | | S1A2 ← | | SUBROUTINE RETURN INSTRUCTION S1D2 |
| A2 | SUBROUTINE CALL INSTRUCTION D2 | → | | SUBROUTINE S2 |
| | | S2D1 → | | INSTRUCTION S2D1 (CONSECUTIVE INSTRUCTION) |
| | | : | | : (CONSECUTIVE INSTRUCTION) |
| | | S2D2 ← | | SUBROUTINE RETURN INSTRUCTION S2D2 |
| : | : | | | SUBROUTINE Sn |
| An | SUBROUTINE CALL INSTRUCTION Dn | → | SnD1 → | INSTRUCTION SnD1 (CONSECUTIVE INSTRUCTION) |
| | | : | | : (CONSECUTIVE INSTRUCTION) |
| | | SnD2 ← | | SUBROUTINE RETURN INSTRUCTION SnD2 |

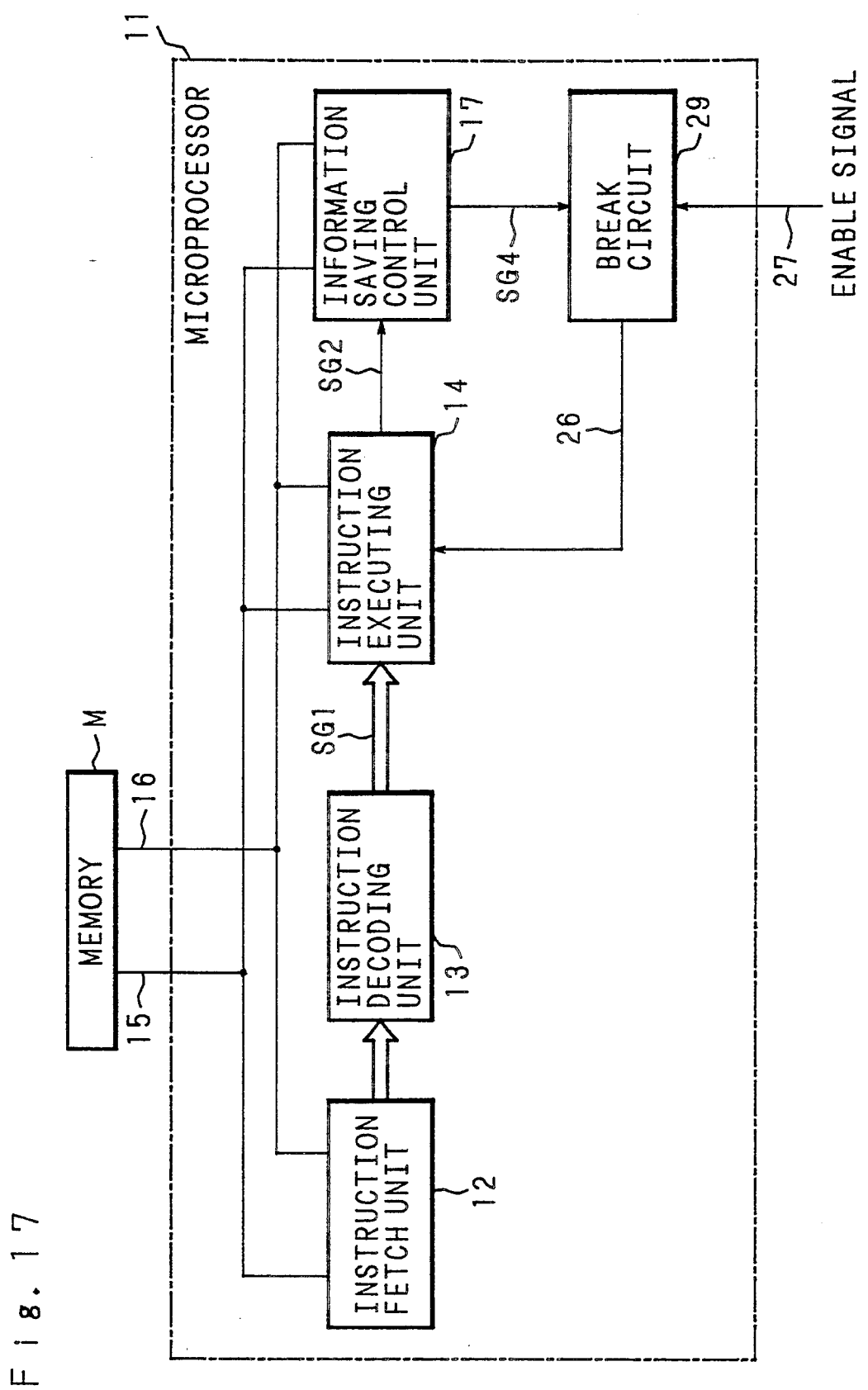

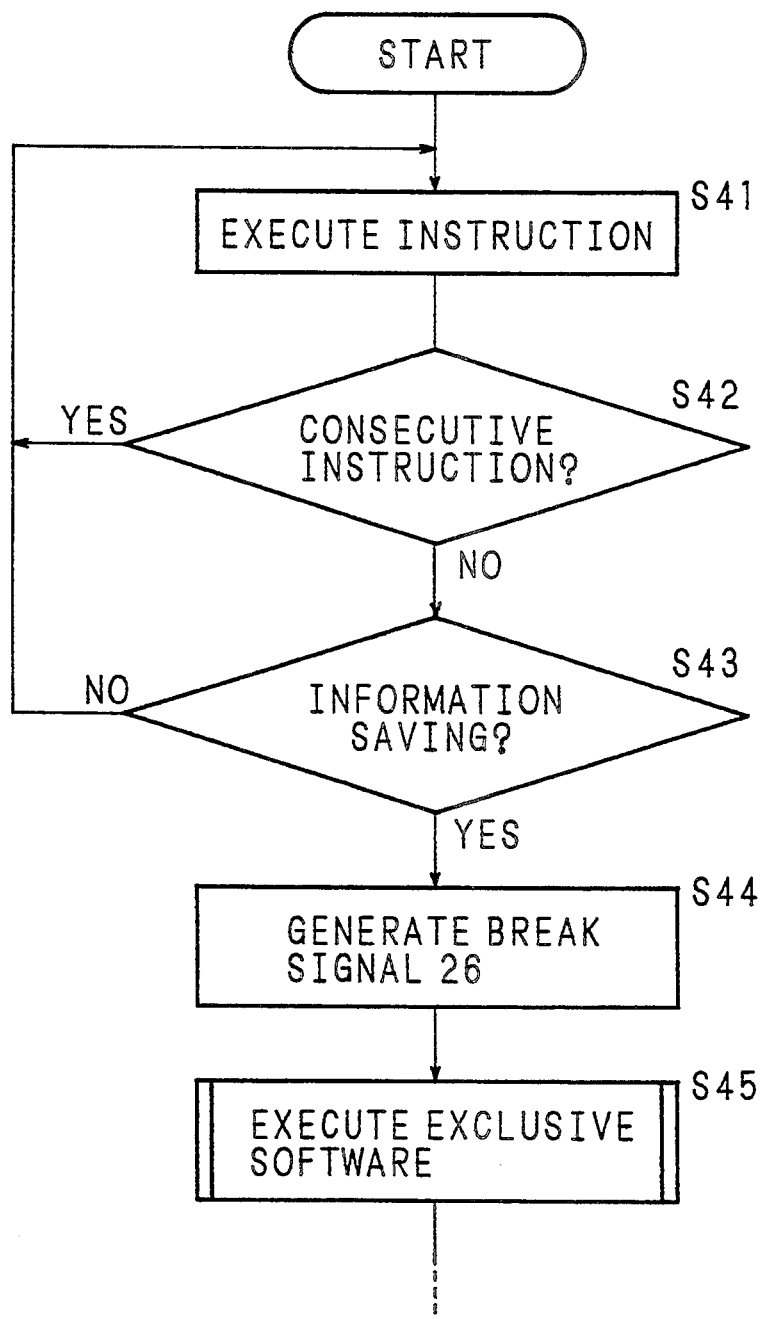

MICROPROCESSOR FOR DEBUGGING PROGRAMS

BACKGROUND OF THE INVENTION

1. Field of the Invention

The present invention relates to a microprocessor, and more particularly, to a microprocessor by which debugging at the time of developing software is facilitated, and a real time software developing environment can be provided.

2. Description of the Related Art

In general, when developing software by using a microprocessor, as a process of debugging programs, the process of providing some breakpoints in steps during execution of the programs is adopted. In case of providing the breakpoints on the program as such, since processings are broken temporarily at the time point when program execution passes the breakpoint, whenever the break occurs, an execution history of the microprocessor is checked before proceeding to the following program executions.

In some cases, though the breakpoint is provided per instruction in an initial step of software development, the breakpoints are generally provided for certain definite number of instructions as a unit as the debugging proceeds, particularly, when the breakpoint is provided in a unit of subroutine to check the instruction execution history, it is possible to grasp a processing flow of the entire softwares.

Meanwhile, when the execution history of a plural number of subroutines can be checked, it can be debugged efficiently.

FIG. 1 is a block diagram showing an example of configuration of a conventional microprocessor.

In FIG. 1, numeral 11 designates a microprocessor comprising, an instruction fetch unit 12, an instruction decoding unit 13, an instruction executing unit 14 and an information saving control unit 17. A memory M is disposed outside the microprocessor 11, and is connected thereto through an address bus 15 and a data bus 16.

The instruction fetch unit 12 fetches an instruction to be processed from the memory M outside the microprocessor 11 via the data bus 16, and gives it to the instruction decoding unit 13.

The instruction decoding unit 13 decodes the kinds and processing formats for the instruction fetched from the memory M by the instruction fetch unit 12. The instruction is decoded by an instruction decoding circuit 23 included in the instruction decoding unit 13, and the decoded result of the instruction is given to the instruction executing unit 14 as a decoded result signal SG1.

The instruction executing unit 14 actually executes the instruction processing, according to the decoded result by the instruction decoding unit 13, more specifically, according to the decoded result signal SG1 outputted from the instruction decoding circuit 23.

The instruction executing unit 14 outputs a save direct signal SG2 to the information saving control unit 17, when executing such an instruction as to return the processing again to an original location, after once executing an instruction group stored at a separate location on the memory M from the instruction being executed at that time point, for example, such as a subroutine call instruction.

The information saving control unit 17 controls the processing of temporarily saving information necessary for returning the processing to the original location, or addresses storing a return address instruction, in the memory M via the data bus 16, when the save direct signal SG2 is given from the instruction executing unit 14, in other words, when the instruction executing unit 14 executes such an instruction as to return the processing again to the original location, after once executing an instruction group stored at a separate location on the memory M from the instruction being executed at that time point, such as a subroutine call instruction.

The aforementioned instruction fetch unit 12, instruction executing unit 14, information saving control unit 17 are interconnected through the address bus 15 and the data bus 16. The microprocessor 11, when fetches an instruction from the memory M or executes the instruction, inputs and outputs data to and from the memory M through the data bus 16, and outputs an address which directs input and output addresses of the data through the address bus 15.

FIG. 2 is a schematic view showing an example of storing state of the instruction to be executed by the microprocessor 11 on the memory M.

In this example, it is assumed that instructions D1, D2 and D3 are respectively stored in addresses A1, A2 and A3 respectively, and they are all consecutive instructions (the instruction stored in the next address is executed next). Since the respective instruction lengths of the instructions D1, D2 and D3 differ when kinds of the instructions differ from each other. For example, assuming that the length of the instruction D1 in the address A1 is L1, the address A2 of the next consecutive instruction D2 coincides with a value derived from adding L1 to the address A1, and similarly, when the length of the instruction D2 is L2, the address A3 coincides with a value derived from adding L2 to the address A2.

Next, an execution process of the instruction group as shown in FIG. 2 by the microprocessor 11 shown in FIG. 1 is described.

When actually executing the instruction, the microprocessor 11, at first, outputs the address A1 to the address bus 15 by the control of the instruction fetch unit 12, and as its response, receives data called an instruction D1 from the memory M via the data bus 16.

The instruction D1 fetched into the microprocessor 11 is decoded by the instruction decoding circuit 23 included in the instruction decoding unit 13, and the decoded result signal SG1 showing the decoded result is given to the instruction executing unit 14. The instruction executing unit 14 executes the instruction D1 according to the decoded result signal SG1 given from the instruction decoding unit 13. When data is inputted to and outputted from the outside in the execution step of the instruction D1, a responding address is outputted to the other outside address via the address bus 15, and when data is outputted, a responding data is outputted via the data bus 16, or when data is inputted, a responding data is inputted from the data bus 16.

According to the above-mentioned processing, execution of the instruction D1 is completed. When the executed instruction D1 is not the non-consecutive instruction such as a subroutine call instruction, the microprocessor 11 fetches and executes a next instruction D2 which is stored consecutively to the instruction D1. By repeating such operations, a plural number of instructions D1, D2 and D3 are executed sequentially.

By the way, a lot of recent microprocessors are so constituted as to execute the instructions in the instruction executing unit 14 by microprograms. FIG. 3 shows a block diagram of a configuration example of a processor which controls instruction execution by a microprogram system.

In the example shown in FIG. 3, a micro ROM 20 which stores the microprograms is included in the instruction executing unit 14 in the microprocessor 11, and various microprograms responding to the instructions are stored in advance in the micro ROM 20. The instruction decoding circuit 23 decodes the fetched instruction to decide an address of the micro ROM 20 in which the microprogram responding thereto is stored, and gives it to the instruction executing unit 14 as the decoded result signal SG1. Then, the instruction executing unit 14, according to the decoded result signal SG1 given from the instruction decoding circuit 23, in other words, according to the address decided by the instruction decoding circuit 23, reads the microprogram from the micro ROM 20, and controls the operation of the instruction executing circuit 21 by the microprogram to process the instruction.

In such a way, since the microprocessor adopting the microprogram system can process the different instructions by using the same instruction executing circuit, a circuit structure can be minimized. Thus, this microprogram system is used in most of the recent microprocessors.

Next, as an example of the case where discontinuity presents in the instruction to be executed, a processing method of the microprocessor 11 when the subroutine call instruction is executed, is described with reference to a schematic view of FIG. 4 showing an example of a storing state on the memory M of the instruction executed by the microprocessor 11.

In FIG. 4, assuming that the subroutine call instruction D2 is stored in the address A2, and the other instruction D1 stored in the address A1 and the instruction D3 stored in the address A3 are all consecutive instructions.

At first, the microprocessor 11 outputs the address A1 to the outside via the address 15, receives data called the instruction D1 via the data bus 16, and executes the instruction in the instruction executing unit 14 in the same manner as described before.

Then, the microprocessor 11 fetches the instruction D2 from the address A2 in which the instruction to be executed next is stored. In this case, since the instruction D2 is the subroutine call instruction for calling a subroutine S1, the information saving control unit 17 operates to save the address 3, in which the instruction D3 to be executed next when the processing returns from the subroutine S1 in the future is stored, in, for example, the memory M outside the microprocessor 11, before the processing by the instruction executing unit 14 branches to the subroutine S1. Then, the microprocessor 11 outputs an address A4 of a head instruction D4 of the subroutine S1 to the address bus 15, and fetches the instruction D4 from the data bus 16 for execution, thereby to proceed the processing of the subroutine S1.

Finally, a subroutine return instruction is stored in an address A5 as an instruction D5 at an exit of the subroutine S1, the microprocessor 11 fetches as data the address A3 which has been previously saved to the outside, and executes the instruction D3 by nominating the data as the next output address.

By the above-mentioned processing, a plural number of instructions including the subroutine call instruction are executed.

By the way, breaking an execution in a unit of subroutine when debugging the program means to break execution of the program to be debugged at an entrance of the subroutine S1. In general, a break of execution of the program is realized by placing an instruction (a break instruction) necessary to break the instruction execution on the address in which a certain instruction is stored. In other words, by substituting the original instruction with the break instruction beforehand, and executing the break instruction by the processor, execution of the program having been executed hitherto can be broken.

However, in this process, before executing the program to be debugged, the subroutine call instruction of the program to be debugged must be located sequentially and substituted with the break instruction. For this purpose, debugging softwares must include functions to decode the program to be debugged to check the location where the subroutine call instruction is stored.

Next, as another example of the case where discontinuity presents in the instruction to be executed, processing procedures by the microprocessor 11 in case of executing a plural number of subroutine call instructions continuously, are described with reference to a schematic view of FIG. 5 showing an example of storing state on the memory M of the instruction executed by the microprocessor 11.

In FIG. 5, it is assumed that subroutine call instructions D1 to Dn which are one of non-consecutive instructions are respectively stored in addresses A1 to An.

At first, the microprocessor 11 outputs the address A1 to the outside via the address bus 15, and receives data called the instruction D1 via the data bus 16. As the result of decoding of the instruction D1 by the instruction decoding unit 13, the instruction D1 is interpreted as the subroutine call instruction for calling the subroutine S1 and as the non-consecutive instruction. As a result, the information saving unit 17, before the processing by the instruction executing unit 14 branches to the subroutine S1, operates to save the address A2, in which the instruction D2 to be executed next when the processing returns from the subroutine S1 in the future is stored, in, for example, the memory M outside the microprocessor 11.

Then, for executing a head instruction S1D1 of the subroutine S1, the microprocessor 11 outputs an address S1A1 of the instruction S1D1 to the address bus 15, fetches the instruction S1D1 from the data bus 16 for execution, thereby to proceed the processing of the subroutine S1.

Finally, since a subroutine return instruction is stored in an address S1A2 as an instruction S1D2 at an exit of the subroutine S1, the microprocessor 11 fetches as data the address A2 which has been previously saved, and executes the instruction D2 by nominating the data as the next output address.

Since the instruction D2 is also the subroutine call instruction for calling a subroutine S2, or the non-consecutive instruction, the address A3 in which the next instruction D3 is stored, is saved and branched to the subroutine S2 by the same procedures. Then, by executing a subroutine return instruction S2D2 at an exit of the subroutine S2, the address A3 which has been previously saved is fetched, and the following instructions are executed by nominating the data as the next output address.

By repeating the above-mentioned operations, a plural number of subroutine call instructions D1 to Dn are executed successively.

FIG. 6 is a flow chart for explaining, procedures by a conventional microprocessor for breaking in a unit of subroutine to break the processing temporarily, and the case of executing the instruction in a state shown in a schematic view of FIG. 5 is described.

As mentioned before, breaking execution in a unit of subroutine when debugging the program means, for example, to break execution of the instruction D2 stored in the address A2, after executing the last instruction S1D2 of the subroutine is executed after the address A1 is outputted by the microprocessor 11. In general, execution of the program is broken by placing a non-consecutive instruction (a break instruction) necessary to break the instruction execution on the address in which a certain instruction is stored. In other words, by substituting the original instruction with the break instruction and executing the break instruction by the processor, the instruction processing having been executed hitherto is made non-consecutive so as to be broken.

In FIG. 6, at first, it is checked whether the instruction D1 is stored in the address A1 is the subroutine call instruction or not, and when it is the subroutine call instruction, the address A2, in which the next succeeding instruction D2 is stored, is calculated by a program routine C1 prepared for checking the length of the instruction D1 and substituting the next instruction with the break instruction (Step S51). The instruction A2 stored in the address A2 is substituted with the break instruction BD beforehand by the program routine C1 (Step S52).

When a program routine is to be processed next by execution of the break instruction BD which is the non-consecutive instruction is designated as C2, after executing the instruction D1 by an output of the address A1 or saving the address A2 to the outside (Step S53), processing the subroutine S1 (instruction S1D1) (Step S54) and executing the instruction S1D2 stored in the address A1A2, that is, fetching the saved address A2 from the outside (Step S55), the break instruction BD is executed by an output of the address A2 (Step S56), and control is moved to a program routine C2.

By the processes as stated above, only execution of the subroutine instruction groups (D1, S1) are realized. When the break instruction BD substituted in the software C2 is restored by the original instruction D2 at the end, it coincides with a usual instruction format (Step S57).

In the aforesaid description, though the case of breaking execution of one subroutine has been described, the execution break of a plural number of subroutines can be realized by repeating the similar procedures. The number of the subroutines having been passed can be obtained by calculating at every breaks.

Now, in recent years, a microprocessor including a function to support the breaking after executing all of the non-consecutive instructions is developed. In such a microprocessor, it is so constituted that, when the execution address continuity is disturbed in the instruction executing unit, the break is generated. FIG. 7 is a block diagram showing an example of configuration of such a conventional microprocessor.

The microprocessor shown in FIG. 7 has the same configuration as that shown in FIG. 1, except that a non-consecutive instruction execution break circuit designated by numeral 30 is added thereto.

The non-consecutive instruction execution break circuit 30 is provided for generating the break at the time of executing all of the non-consecutive instructions, and when the non-consecutive instruction execution break circuit 30 generates a break, a break of instruction execution is designated to the instruction executing unit 14 by a break signal 26.

Next, the operation of the microprocessor shown in FIG. 7 is described. Procedures of executing the usual consecutive instructions and the non-consecutive instruction without a break are same as the procedures of the microprocessor shown in FIG. 1, so the explanation thereof is omitted.

FIG. 8 is a flow chart for explaining procedures for temporarily breaking the processing by breaking at an entrance of the subroutine by the conventional microprocessor shown in FIG. 7, wherein instructions executed by the microprocessor 11 are stored on the memory M in the state as shown in a schematic view of FIG. 9.

That is, in FIG. 9, the consecutive instruction D1 is stored in the address A1, the non-consecutive instructions D2 which does not save information is stored in the address A2, the consecutive instruction D3 is stored in the address A3, the subroutine call instruction D4 which is the non-consecutive instruction is stored in the address A4 and the consecutive instruction D5 is stored in the address A5. The subroutine S1 starts from the instruction S1D1 stored in the address S1A1.

In the microprocessor as shown in FIG. 7, as mentioned before, a function to support a break after executing all of the non-consecutive instructions (the non-consecutive instruction executing break circuit 30) is included, to generate a break when the execution address continuity is disturbed in the instruction executing unit 14. However, in that case, a break is generated irrespective of whether or not information is saved by the information saving control unit 17. And hence, for breaking the processing only when branching to the subroutine, it is necessary to check whether or not the information has been saved.

In FIG. 8, a process of breaking the processing at the entrance of the subroutine S1 to be passed next, by execution from the instruction D1 is described.

At first, before executing the instruction, the non-consecutive instruction execution break circuit 30 of the microprocessor 11 is set to be active by the processing of the program routine C1 (Step S61).

Then, the microprocessor 11 executes the respective instructions successively (Step S62). The microprocessor 11 judges whether or not the instruction is the non-consecutive instruction (Step S63), and when the instruction is the consecutive instruction, the processing returns to Step S62 to execute the next instruction, and when the instruction is the non-consecutive instruction, the break signal 26 is outputted from the non-consecutive instruction execution break circuit 30 and the processing is broken temporarily (Step S64).

Thus, in the example in FIG. 9, though the microprocessor 11 starts execution from the instruction D1, since the first instruction D1 is the consecutive instruction, the next instruction D2 is executed. However, since the instruction D2 is non-consecutive instruction, the processing is broken.

Next, the microprocessor 11 judges whether or not the non-consecutive instruction at the time of generating the break is the instruction by which information is saved by the information saving control unit 17, by decoding an instruction format within the processing period of the program routine C2 to be executed after the break (Steps S65, S66). As a result, when it is judged that the instruction does not save information, the microprocessor 11 returns to Step S62 to process the next instruction.

Thus, in this case, though the instruction D2 is the non-consecutive instruction, as it is not necessary to save information, the microprocessor 11 executes the next instruction D3.

However, when the non-consecutive instruction at the time of generating the break requires to save information, the microprocessor 11 breaks the processing without executing the next instruction (Step S67).

Thus, when the instruction D4 which is the second non-consecutive instruction is executed, the processing is broken again, and since it is judged that the instruction D4 is the instruction to save information by the information saving control unit 17, the microprocessor 11 breaks the processing without executing the instruction S1D1 which is the instruction of the entrance of the subroutine S1 (Step S65).

When realizing the break at the time of executing the non-consecutive instruction such as the execution break in a unit of subroutine as stated above, a complicated software for decoding the instruction length, or decoding the program to be debugged to search the subroutine call instruction, or substituting the subroutine call instruction with the break instruction, must be developed, and in an area where the instruction of a ROM (read only memory) can not be substituted, this break function can not be used.

It is also problematic in that, in a microprocessor comprising non-consecutive instruction execution break means, whenever the non-consecutive instruction is executed, a real time break environment can not be realized because the processing is broken temporarily.

SUMMARY OF THE INVENTION

The present invention has been devised to solve the above-mentioned problems, therefore, it is an object of a first invention to provide a microprocessor capable of breaking in a unit of subroutine under a simple control when debugging programs, of breaking without decoding the programs to be debugged and of debugging efficiently in a real time environment.

It is an object of a second invention to provide a microprocessor capable of breaking at the time of executing the non-consecutive instruction such as breaking in a unit of subroutine under a simple control when debugging programs, of breaking without decoding the instruction each time and of debugging efficiently in a real time environment.

It is an object of a third invention to provide a microprocessor capable of breaking at the time of executing the non-consecutive instruction such as breaking in a unit of subroutine under a simple control when debugging programs breaking without decoding each time and of debugging efficiently in a real time environment.

It is an object of a fourth invention to provide a microprocessor capable of breaking at the time of executing the non-consecutive instruction such as an execution break at an entrance of a subroutine under a simple control when debugging programs, of breaking without decoding the instruction each time and of debugging efficiently in a real time environment.

The first invention of the microprocessor according to the present invention comprises, instruction fetching means for fetching respective instructions of an instruction set including a subroutine call instruction and a trap instruction from storing means outside the microprocessor, instruction decoding means for decoding instruction fetched into the instruction fetching means to output an internal signal responding to the decoded result, instruction executing means for executing the instruction according to the internal signal outputted from the instruction decoding means, and mode setting means for setting either a first mode in which the trap instruction is not executed or a second mode in which the trap instruction can be executed, wherein the instruction decoding means outputs the internal signal directing execution of a subroutine call to the instruction executing means when decoding the subroutine call instruction in case of operating in the first mode, and outputs the internal signal directing execution of a trap to the instruction executing means when decoding the subroutine call instruction in case of operating in the second mode.

In such a first invention of the microprocessor of the present invention, in the case where the instruction decoding means operates in the first mode, when the decoded instruction is the subroutine call instruction, the internal signal which directs execution of the subroutine call is outputted to the instruction executing means, and in the case where it operates in the second mode, when the decoded instruction is the subroutine call instruction, the internal signal which directs execution of the trap is outputted to the instruction executing means. Thus, execution of the program to be debugged is broken automatically at the time of debugging, and the control is moved to the debugging software.

The second invention of the microprocessor of the present invention comprising, instruction fetching means for fetching respective instructions of an instruction set including a first kind of instruction executing the non-consecutive processing and a second kind of instruction executing the consecutive processing from the storing means outside the microprocessor, instruction decoding means for decoding the instruction fetched into the instruction fetching means to output the internal signal responding to the decoded result, instruction executing means for executing the instruction according to the internal signal outputted from the instruction decoding means, and information saving controlling means which, when the instruction fetched by the instruction fetching means is the first kind of instruction, controls to save information necessary in the future to execute the succeeding first or second instruction to the outside, and further comprising saved information holding means for holding the same information as the information to be saved to the outside by the information saving controlling means, and comparing means which compares information fetched from the outside by the instruction executing means in order to execute the instruction succeeding the first kind of instruction with information saved in the saved information holding means, and when they coincide, makes the instruction executing means break all subsequent processings without executing the instruction succeeding the first kind of instruction.

In such a second invention of the microprocessor of the present invention, when the non-consecutive instruction represented by the subroutine call instruction is executed, simultaneously with information on the return address to be saved to the outside, the same information is saved also in the internal saved information holding means. When the subsequent return instruction represented by the return instruction from the subroutine is executed, information of the address to be executed next fetched from the outside and information saved in the saved information holding means are compared with each other, and when they coincide, the break is generated and the control is handed over to an exclusive software.

Furthermore, the third invention of the microprocessor of the present invention comprising, instruction fetching means for fetching respective instructions of an instruction set including a first kind of instruction executing the non-consecutive processing and a second kind of instruction executing the consecutive processing from the storing means outside the microprocessor, instruction decoding means for decoding the instruction fetched into the instruction fetching means to output an internal signal responding to the decoded result, instruction executing means for executing the instruction according to the internal signal outputted from the instruction decoding means, and information saving controlling means which, when the instruction fetched by the instruction fetching means is the first kind of instruction, controls to save information necessary in the future to execute the succeeding first or second instruction to the outside, and further comprising saved information holding means for holding the same information as the information to be saved to the outside by the information saving controlling means, and counting means, in which any initial value is set as a count value, compares information fetched from the outside by the instruction executing means in order to executes the instruction succeeding the first kind of instruction with information saved in the saved information holding means, down-counts its own count value whenever they coincide, and makes the instruction executing means break all subsequent processings without executing the instruction succeeding the first kind of instruction when the count value becomes a predetermined value.

In such a third invention of the microprocessor of the present invention, when the non-consecutive instruction represented by the subroutine call instruction is executed, simultaneously with information on the return address to be saved to the outside, the same information is saved also in the internal saved information holding means. When the subsequent return instruction represented by the return instruction from the subroutine is executed, information on the address to be executed next fetched from the outside and information saved in the saved information holding means are compared with each other, and whey they coincide, the count value is decremented by 1, and at the time point when the count value becomes 0, the break is generated and the control is handed over to an exclusive software.

Furthermore, the fourth invention of the microprocessor of the present invention comprising, instruction fetching means for fetching respective instructions of an instruction set including a first kind of instruction executing the non-consecutive processing and a second kind of instruction executing the consecutive processing from the storing means outside the microprocessor, instruction decoding means for decoding the instruction fetched into the instruction fetching means to output an internal signal responding to the decoded result, instruction executing means for executing the instruction according to the internal signal outputted from the instruction decoding means, and information saving controlling means which, when the instruction fetched by the instruction fetching means is the first kind of instruction, controls to save information necessary in the future to execute the succeeding first or second instruction to the outside, and further comprising breaking means for breaking all subsequent processings only when the information is saved to the outside by the information saving controlling means.

In such a fourth invention of the microprocessor of the present invention, when the non-consecutive instruction represented by the subroutine call instruction is executed, the information saving controlling means operates to save information such as the return address to the outside, and a break signal becomes active to generate the break.

The above and further objects and features of the invention will more fully be apparent from the following detailed description with accompanying drawings.

BRIEF DESCRIPTION OF THE DRAWINGS

FIG. 2 is a schematic view showing an example of storing state on a memory outside a microprocessor of instructions executed by the microprocessor, FIG. 5 is a schematic view showing an example of storing state on a memory outside a microprocessor of instructions executed by the microprocessor, FIG. 17 is a block diagram showing a configuration of one embodiment of a fourth invention of a microprocessor of the present invention, and FIG. 18 is a flow chart showing procedures done by a fourth invention of a microprocessor of the present invention, for breaking at an entrance of subroutine to break the processing temporarily, when a subroutine call instruction which is one of non-consecutive instructions is executed.

DESCRIPTION OF THE PREFERRED EMBODIMENTS

In the following, the present invention is particularly described on the basis of the drawings showing the embodiments. At first, a first invention is described.

Figure 1:
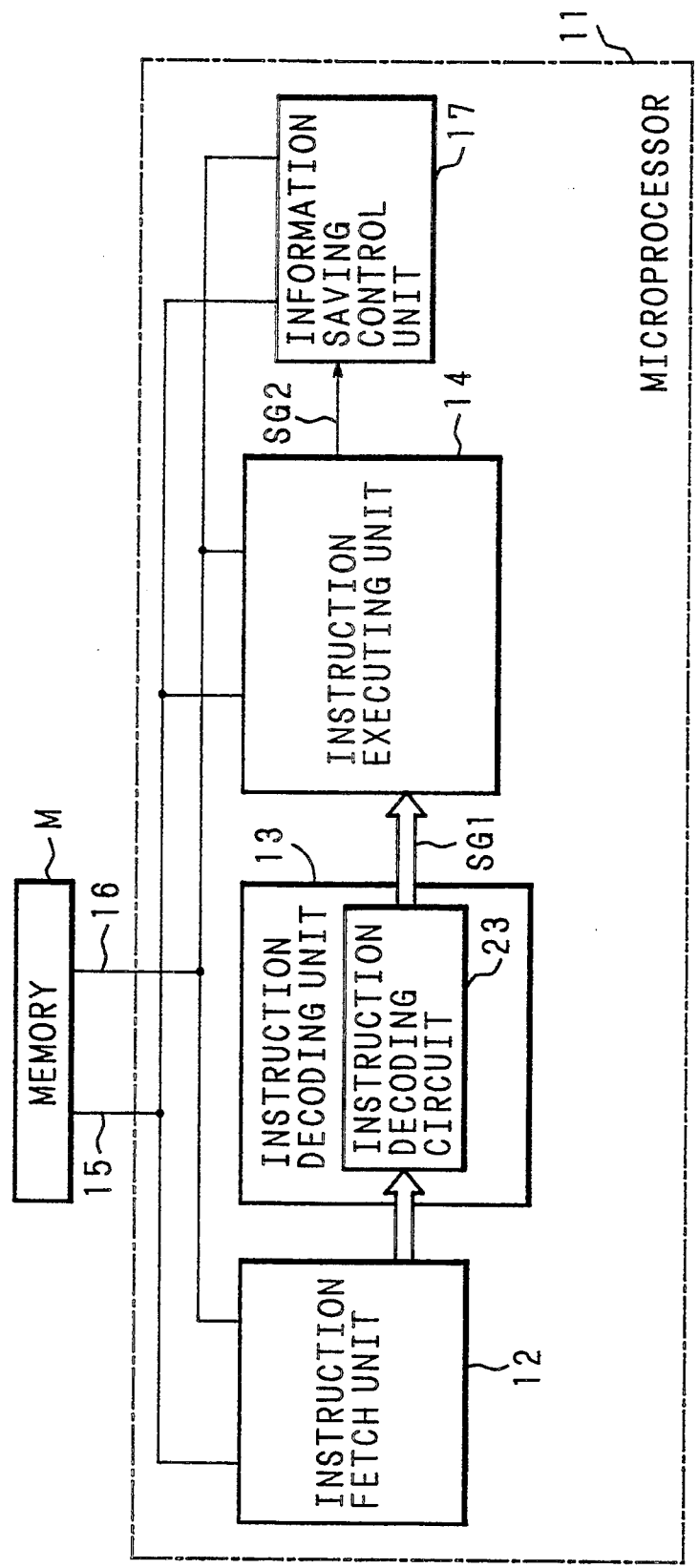
FIG. 1 is a block diagram showing an example of configuration of a conventional microprocessor.
Figure 3:
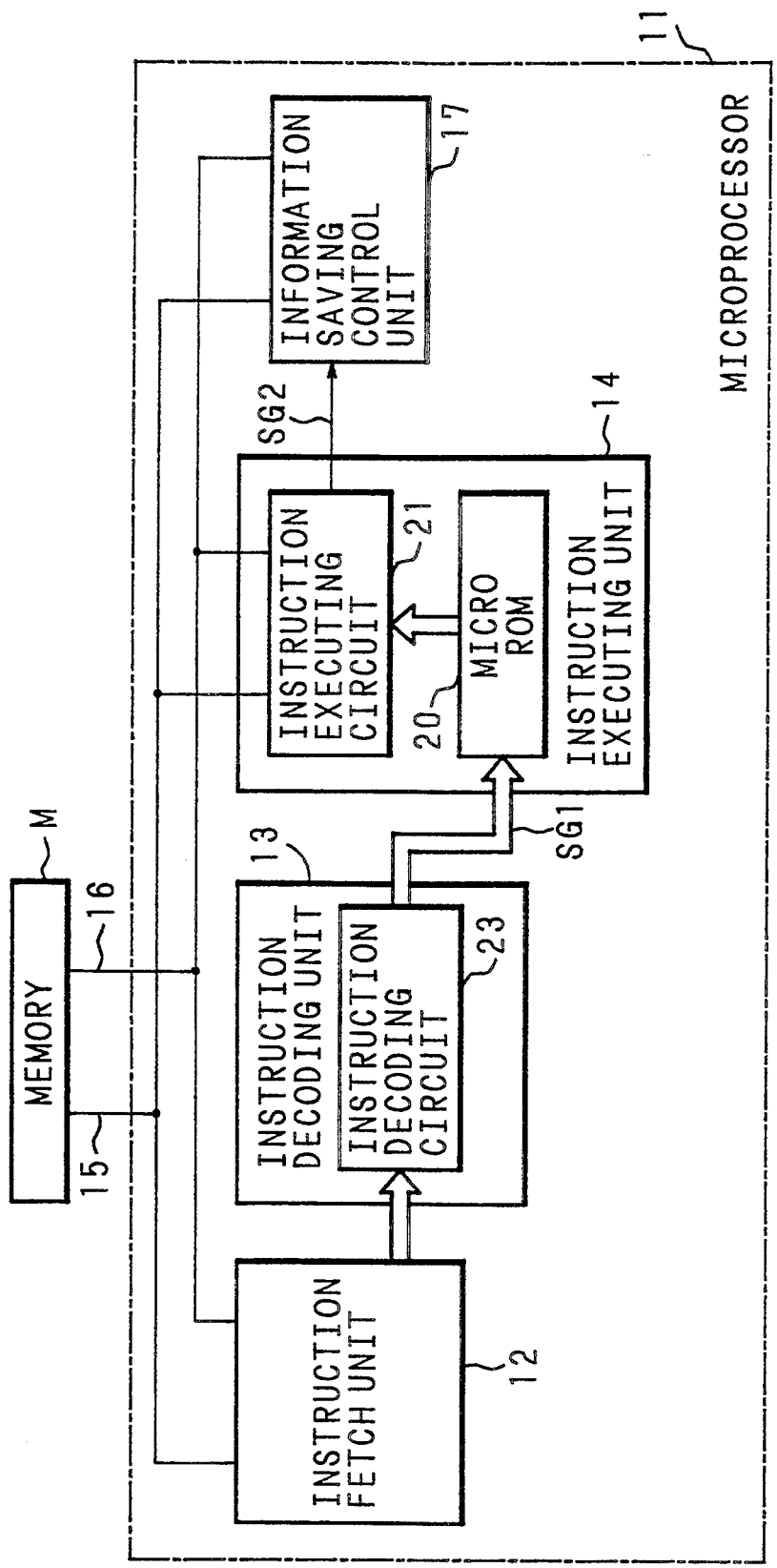
FIG. 3 is a block diagram showing an example of configuration of a conventional microprocessor controlling instruction execution by a microprogram system.
Figure 10:
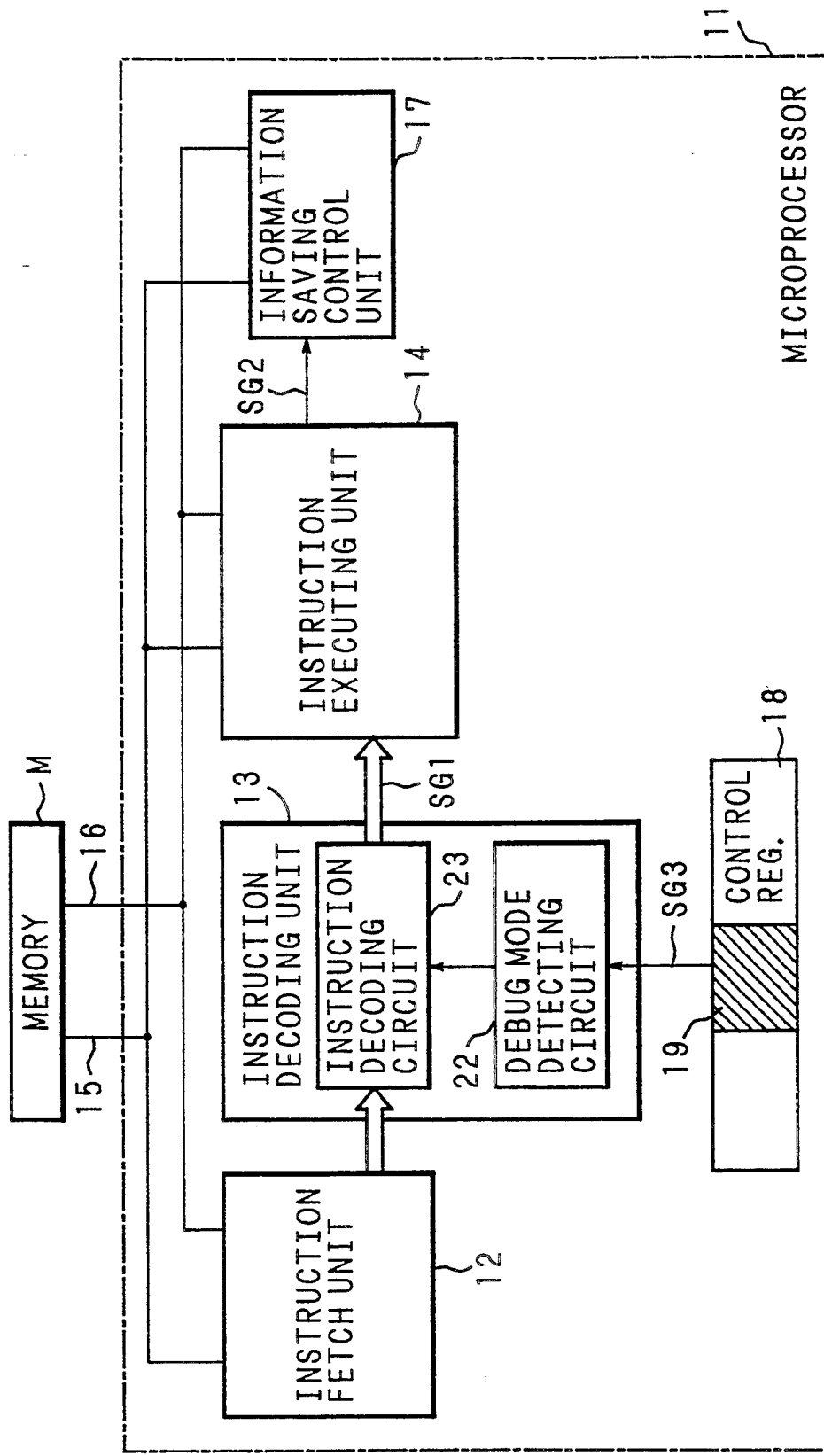
FIG. 10 is a block diagram showing a configuration of one embodiment of a first invention of a microprocessor of the present invention.

FIG. 10 is a block diagram showing a configuration of one embodiment of a first invention of a microprocessor of the present invention. In FIG. 10, the same reference characters in FIG. 1 which were referred to in the description of the aforementioned conventional example designate the same or corresponding parts.

In FIG. 10, numeral 11 designates a microprocessor of the present invention, wherein besides an instruction fetch unit 12, an instruction decoding unit 13, an instruction executing unit 14, an information saving controlling unit 17 and so on are included in the same way as in the conventional example, a control register 18 is disposed. A memory M (external storing means) is disposed outside the microprocessor 11 for connection through an address bus 15 and a data bus 16.

The instruction fetch unit 12 fetches instructions to be processed from the memory M outside the microprocessor 11 via the data bus 16, and sends them to the instruction decoding unit 13.

The instruction decoding unit 13 decodes kinds, processing formats and the like of the instruction fetched from the memory M by the instruction fetch unit 12. Though the facts that the instruction is decoded by an instruction decoding circuit 23 included in the instruction decoding unit 13 and that the decoded result is given to the instruction executing unit 14 as a decoded result signal SG1, are done in the same way as the aforementioned conventional example, in the microprocessor of the present invention, a debug mode detecting circuit 22 to be described later is also included.

The instruction executing unit 14, according to the decoded result done by the instruction decoding unit 13, more specifically, according to the decoded result signal SG1 outputted from the instruction decoding unit 23, practically executes the instruction processing.

The instruction executing unit 14 outputs a save direct signal SG2 to the information saving controlling unit 17, when executing the instruction to return the processing again to an original location, after once executing an instruction group stored at a separate location on the memory M from the instruction being executed at that time point, for example, such as a subroutine call instruction.

The information saving controlling unit 17, when the save direct signal SG2 is given from the instruction executing unit 14, in other words, when the instruction executing unit 14 executes the instruction to return the processing again to the original location, after once executing the instruction group stored at the separate location on the memory M from the instruction being executed at that time point, such as the subroutine call instruction, controls the processing to temporarily save information necessary for returning the processing to the original location, or address storing a return address instruction, in the memory M via the data bus 16.

The control register 18 is used to designate various execution modes of the microprocessor 11 of the present invention, and a debug mode set field 19 for designating a debug mode is provided at a portion thereof. The debug mode detecting circuit 22 which detects a debug mode signal SG3 outputted when the debug mode is set in the debug mode set field 19, and outputs its content to the instruction decoding circuit 23, is included in the instruction decoding unit 13 as mentioned before.

The above-mentioned instruction fetch unit 12, instruction executing unit 14 and information saving controlling unit 17 are interconnected by the address bus 15 and the data bus 16. The data bus 16 inputs and outputs data to and from the memory M, when fetching the instruction from the memory M outside the microprocessor 11 and executing the instruction, and the address bus 15 outputs the address directing the data input and output addresses.

Figure 11:
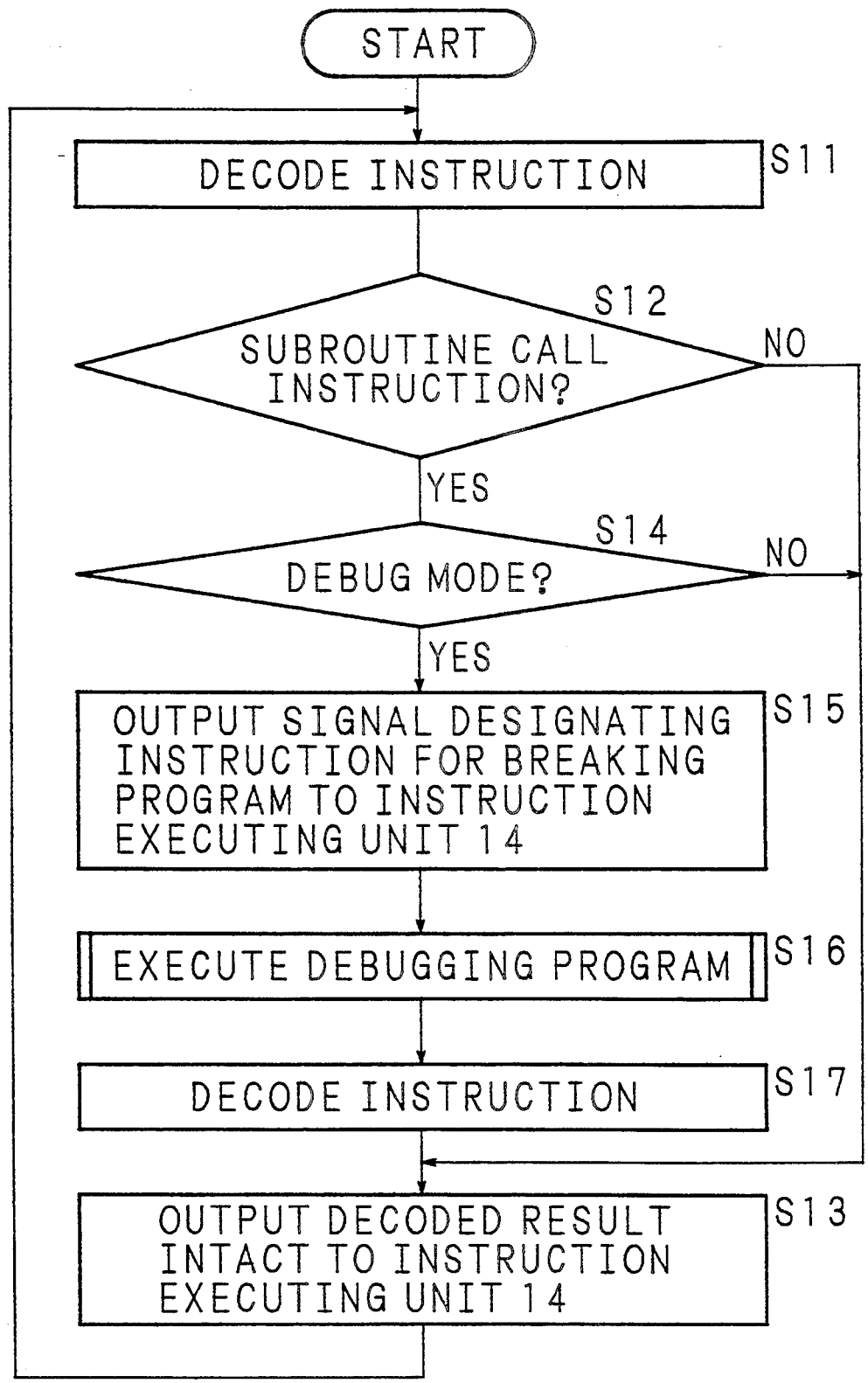
FIG. 11 is a flow chart showing procedures of an instruction decoding unit of a microprocessor of a first invention.

Next, the operation of the microprocessor of the first invention having the aforementioned configuration is described with reference to a flow chart of FIG. 11 showing procedures of the instruction decoding unit 13.

The instruction decoding circuit 23 of the instruction decoding unit 13 decodes the instruction fetched by the instruction fetch unit 12 from the memory M outside the microprocessor 11 via the data bus 16 (Step S11), and judges whether or not it is the subroutine call instruction (Step S12). As the result, when it is judged to be the subroutine call instruction, the instruction decoding circuit 23 judges whether or not the debug mode is designated by the debug mode set field 19 of the control register 18, by whether or not the debug mode signal SG3 is detected by the debug mode detecting circuit 22 (Step S4).

When the debug mode which breaks execution of the program during execution of the subroutine call instruction is designated, the instruction decoding circuit 23 interprets the subroutine call instruction as the instruction breaking the program execution, and outputs a signal corresponding thereto to the instruction executing unit 14 as the decoded result signal SG1 (Step S15).

Thereby, the instruction executing unit 14 executes the instruction breaking the program execution, and thereafter, the control is moved to the debugging program (Step S16).

When it is judged in Step S14 that the debug mode is not designated, in other words, when the debug mode designated by the debug mode set field 19 is the mode not designating break of the program execution, even when the instruction fetched by the instruction fetch unit 12 is the subroutine call instruction, since the debug mode detecting circuit 22 has detected the fact, the instruction decoding circuit 23 outputs intact the instruction decoded result to the instruction executing unit 14 (Step S13).

In this case, the instruction executing unit 14 executes intact the subroutine call instruction.

Meanwhile, when it is judged in Step S12 that it is not the subroutine call instruction, the instruction decoding circuit 23 outputs intact the instruction decoded result to the instruction executing unit 14 (Step S13).

In this case, the instruction executing unit 14 executes intact the instruction.

The instruction breaking execution of the program executed by decoded result signal SG1 given to the instruction executing unit 14 from the instruction decoding circuit 23 in Step S15, after saving information by the information saving controlling unit 17 so as to be able to return again to the subroutine call instruction which was the original instruction of that instruction, moves execution to the debugging program. After completing the debugging program processing by such control, execution of the program to be debugged can be continued again.

Since the instruction to be executed immediately after returning from the debugging program is the subroutine call instruction which is previously caused by the execution break of the program, when it is decoded intact by the instruction decoding circuit 23, execution of the program is broken again by this instruction and execution of the program to be debugged can not proceed further. Thus, the instruction decoded by the instruction decoding circuit 23 immediately after the instruction for returning from the debugging program to the program to be debugged, is controlled such that the decoded result is given intact to the instruction executing unit 14 (Step S17). By such a control, the subroutine call instruction to be executed immediately after the completion of debugging program is executed intact, without being interpreted into the instruction which breaks execution.

Figure 12:
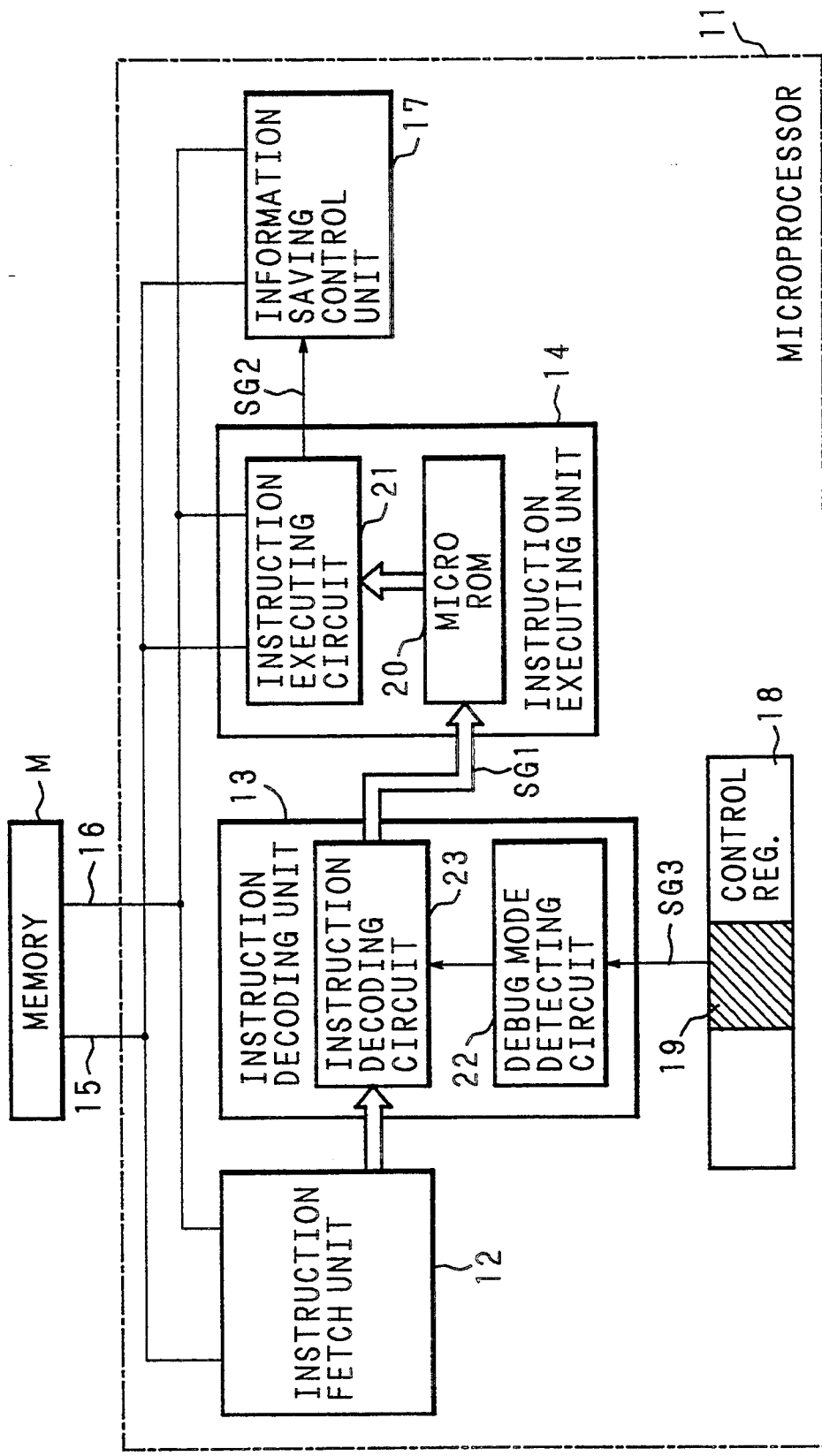
FIG. 12 is a block diagram showing an example of configuration of processor of a microprogram system, as another embodiment of a first invention of a microprocessor of the present invention.

FIG. 12 is a block diagram showing an example of configuration of a processor of a microprogram system, as another embodiment of a first invention of the present invention.

In the example shown in FIG. 12, a micro ROM 20 storing microprograms is included in the microprocessor 11, and various microprograms responding to respective instructions are stored in the micro ROM 20 beforehand. The instruction decoding circuit 23 decodes the fetched instruction and decides an address of the micro ROM 20, in which the microprogram responding thereto is stored, to give it to the micro ROM 20 as the decoded result signal SG1. Next, the instruction executing unit 14 reads the microprogram from the micro ROM 20, according to the decoded result signal SG1 given from the instruction decoding circuit 23, or the address decided by the instruction decoding circuit 23, and controls the operation of the instruction executing circuit 21 by the microprogram to process the instruction.

The operation of the microprocessor shown in FIG. 12 is as follows.

The instruction decoding circuit 23 decodes the instructions, according to the debug mode designated by the debug mode set field 19 given via the debug mode detecting circuit 22. When the debug mode is a mode not directing the execution break of the program, the instruction decoding unit 13 hands over intact the address of the micro ROM 20, in which the microprogram responding to the decoded result is stored, to the instruction executing unit 14 as the decoded result signal SG1 to execute the instruction.

While, when the debug mode is a mode directing the break of program execution, the instruction decoding unit 13 decodes the subroutine call instruction, and hands over the address of the micro ROM 20, in which the microprogram breaking the program being executed is stored, to the instruction executing unit 14 as the decoded result signal SG1 to execute the instruction.

However, also in this case, when the decoded instruction is not the subroutine call instruction, the instruction decoding circuit 23 hands over the address of the micro ROM 20, in which the microprogram responding to the decoded result is stored, intact to the instruction executing unit 14 as the decoded result signal SG1 to execute the instruction.

As stated above, in the first invention of the microprocessor of the present invention, since the instruction decoding unit 13 capable of breaking the program being executed at that time point when fetching and decoding the subroutine call instruction, is included in the microprocessor 11, the break is effected easily by the subroutine call instruction, without decoding the program to search the subroutine call instruction or placing the break instruction at that location, thus the debugging can be effected efficiently under a real time program control.

Next, a second invention of the microprocessor of the present invention is described.

Figure 13:
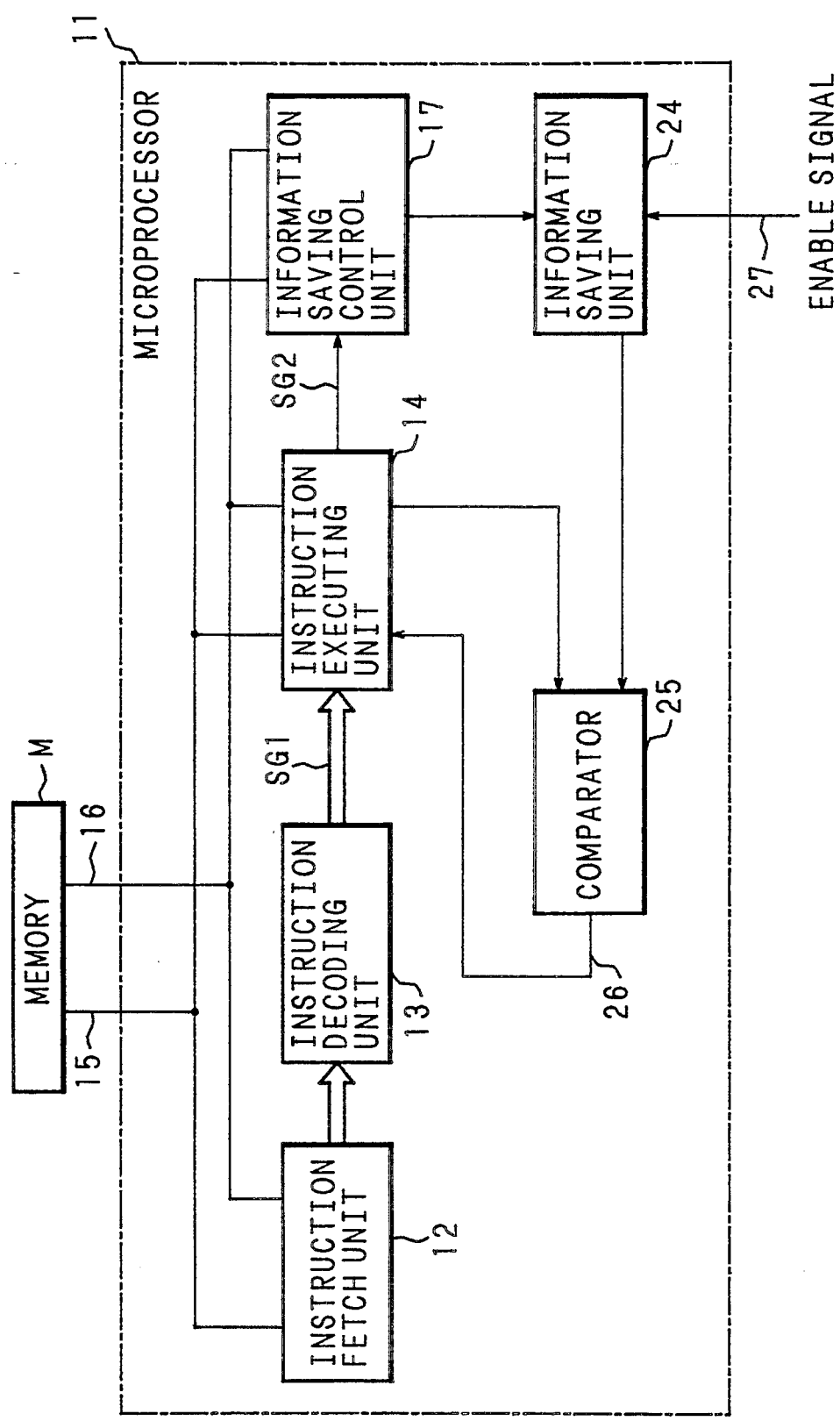
FIG. 13 is a block diagram showing a configuration of one embodiment of a second invention of a microprocessor of the present invention.

FIG. 13 is a block diagram showing a configuration of one embodiment of the second invention of the microprocessor of the present invention shown in FIG. 13. In FIG. 13, the same reference characters in FIG. 1 which were referred to in the description of the aforementioned conventional example, and those in FIG. 10 which were referred to in the description of the first invention designate like or corresponding parts.

A difference between the second invention shown in FIG. 13 from the first invention shown in FIG. 10 is that, in place of the control register 18, an information saving unit 24 and a comparator 25 are included.

The information saving unit 24 is a buffer provided for holding the same data as data of the return address and so on to be saved in the memory M outside the microprocessor 11 by the information saving controlling unit 17.

The comparator 25 compares the data held in the information saving unit 24, and the return address saved in the memory M outside the microprocessor 11 and fetched when executing the return instruction represented by the subroutine return instruction, and when they coincide, outputs a break signal 26. When the break signal 26 is outputted from the comparator 25, the microprocessor 11 breaks execution of program for exclusive break processing.

Numeral 27 designates an enable signal, which is a signal line directing whether to hold data in the information saving unit 24 or not.

Next, the operation of the above-mentioned microprocessor of the second invention is described.

Figure 14:
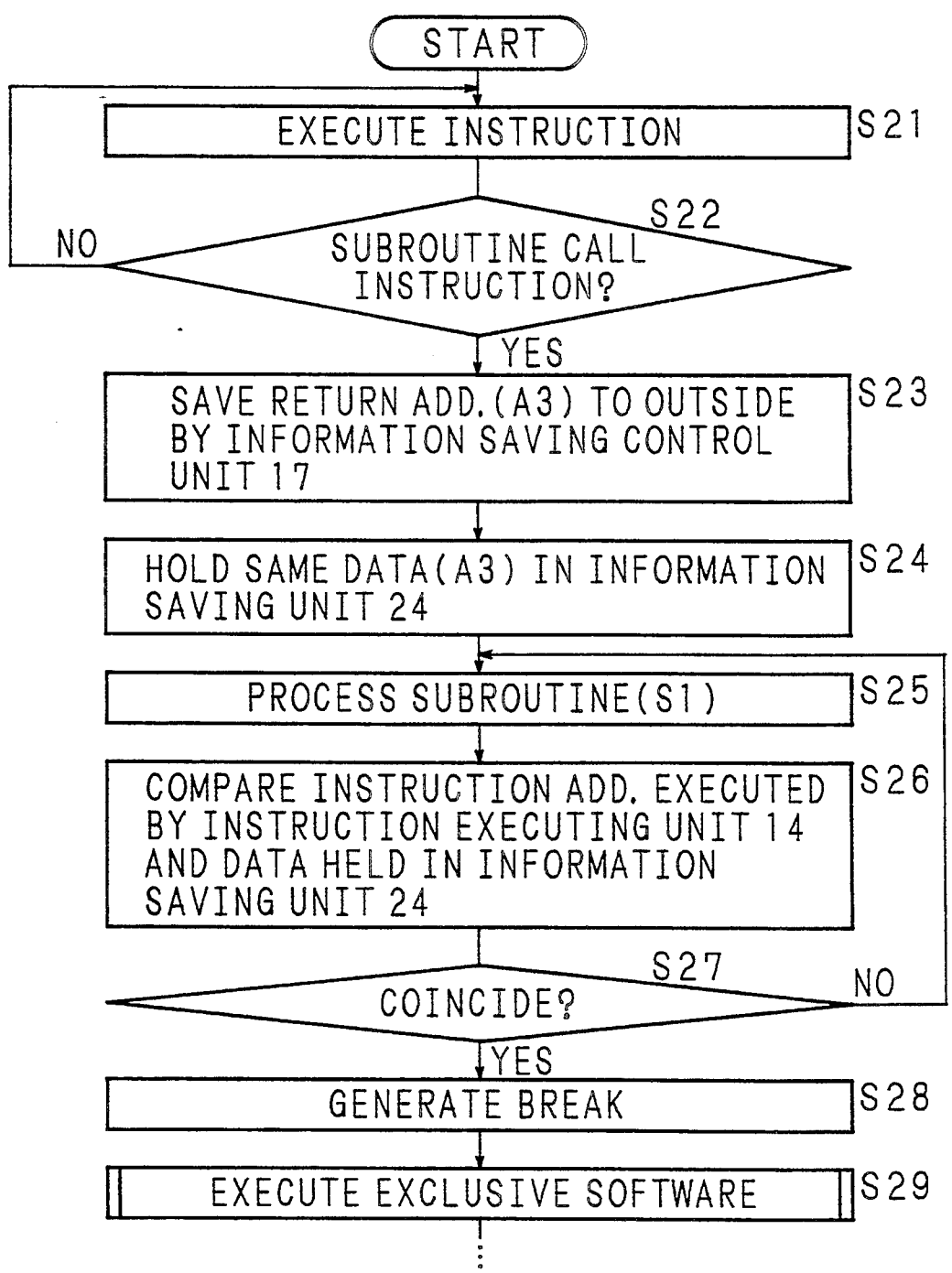
FIG. 14 is a flow chart showing procedures done by a second invention of a data processor of the present invention, for breaking in a unit of subroutine to break the processing temporarily, when a subroutine call instruction which is one of non-consecutive instructions is executed.

FIG. 14 is a flow chart showing processing procedures by the data processor of the present invention for breaking in a unit of subroutine when executing the subroutine call instruction which is one of non-consecutive instructions, to break the processing temporarily. A storing state on the memory M of the instruction to be executed is same as that shown in FIG. 4.

In the flow chart shown in FIG. 14, the enable signal 27 is always kept active.

Figure 4:
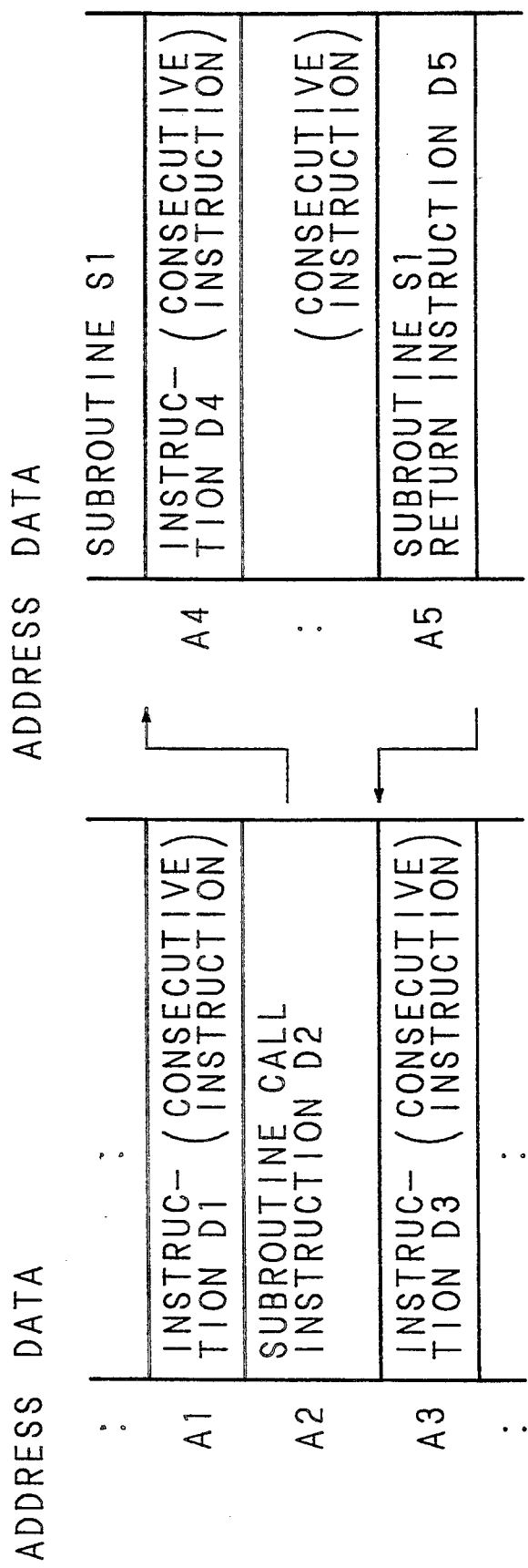
FIG. 4 is a schematic view showing an example of storing state on a memory outside a microprocessor of instructions executed by the microprocessor.
Figure 6:
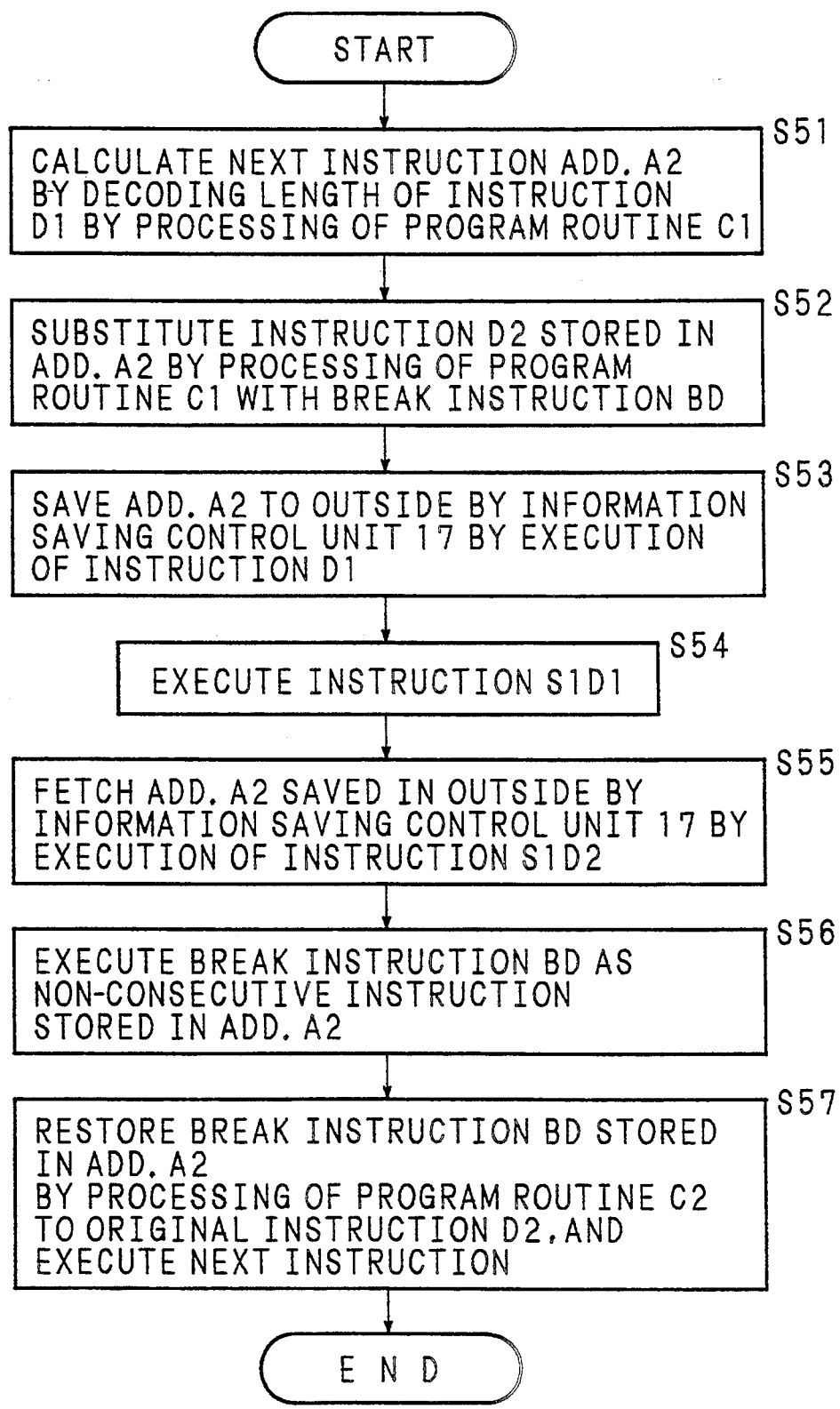
FIG. 6 is a flow chart explaining procedures done by a conventional microprocessor for breaking in a unit of subroutine to break the processing temporarily.
Figure 7:
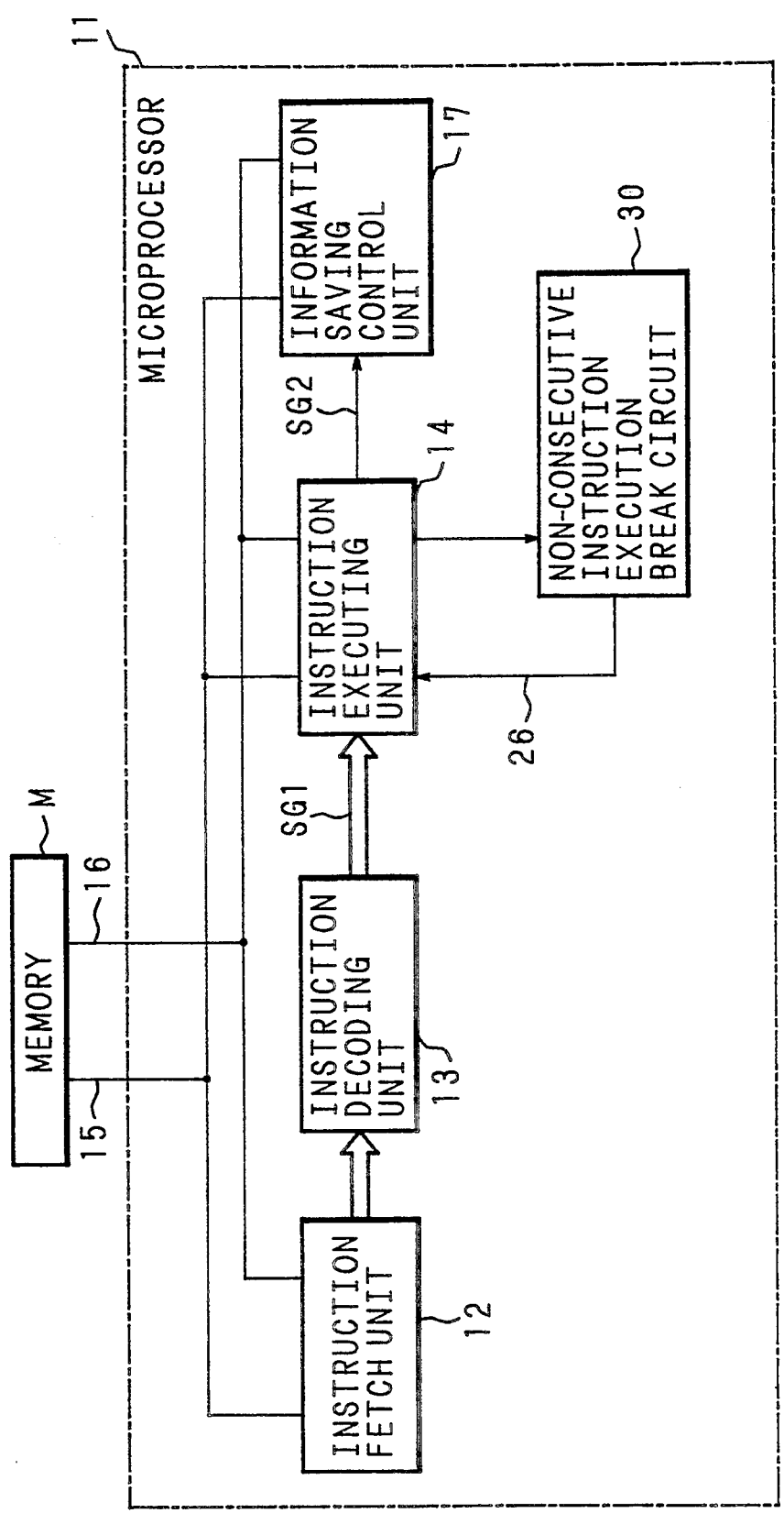
FIG. 7 is a block diagram showing an example of configuration of a conventional microprocessor for breaking in a unit of subroutine to break the processing temporarily.
Figure 8:
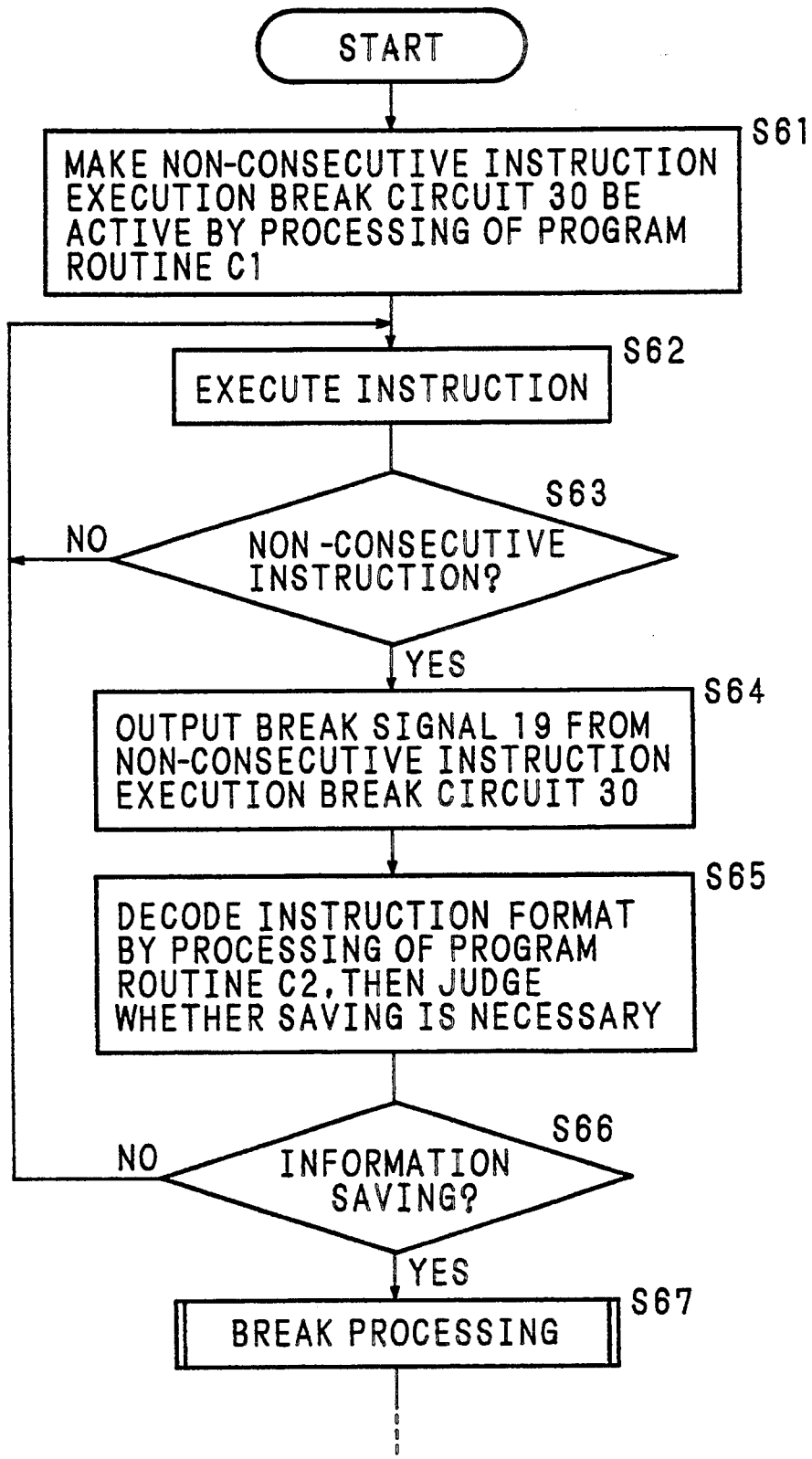
FIG. 8 is a flow chart explaining procedures for breaking at an entrance of a subroutine to break the processing temporarily by a conventional microprocessor shown in FIG. 7.

The instruction executing unit 14 executes successively from the instruction D1 stored in the address A1 shown in FIG. 4 (Step S21, S22). By executing the subroutine call instruction D2 which is the non-consecutive instruction stored in the address A2, the addresses A3 in which the instruction D3 next to the instruction D2 is stored, is saved in the memory M outside the microprocessor 11 by the information saving controlling unit 17 (Step S23). Simultaneously, data called the address A3 is held in the information saving unit 24 (Step S24).

Next, instruction execution is moved to a subroutine S1 and the instruction D4 stored in the head address A4 is executed successively (Step S25). At this time, data A3 held in the information saving unit 24 is always compared with an address value of the instruction executed in the instruction executing unit 14 by the comparator 25 thereafter (Step S26). As long as they do not coincided, the instruction executing unit 14 proceeds instruction execution one after another.

When the instruction executing unit 14 executes the subroutine return instruction D5 which is one of the non-consecutive instructions stored in the address A5, the address A3 saved to the outside as the address of the instruction to be executed next is fetched into the instruction executing unit 14 and outputted to the comparator 25. Thereafter, though the instruction stored in the next address A3 must be executed, at this time point, a coincidence is detected by the comparison processing continued by the comparator 25 (Step S27). And hence, the break is generated and the break signal 26 is given to the instruction executing unit 14 from the comparator 25, so that the instruction of the address A3 is not executed and the control is given to an exclusive software (Step S29).

By the above-mentioned procedures, only execution of subroutine instruction groups (D2, S1) is realized, and thereafter, the exclusive software is executed.

In the embodiment of the second invention of the microprocessor of the present invention, though the case where the enable signal 27 is always active is shown, in case of realizing the break only at execution of a certain specific non-consecutive instruction when a plural number of non-consecutive instructions represented by the subroutine call instruction are present, the time point of generating the break can be selected when the enable signal 27 is set active only at execution of the specific non-consecutive instruction.

Also, in the above-mentioned embodiment, though a generating process of a break associated with an address saved by execution of the subroutine call instruction and the subroutine return instruction is shown, since the generation of the break at the time of return from a break processing can be controlled by the same process even at execution of the instruction showing a discontinuity such as the break processing generally used as an urgent processing of the microprocessor, an entry time of an unpredictable asynchronous processing can be detected.

It will be appreciated that the second invention of the microprocessor of the present invention as described above can be applied in the processor of the microprogram system.

As stated above, in the second invention of the microprocessor of the present invention, since the information saving unit 24 for holding therein the same data as the address which is saved to the outside when executing the non-consecutive instruction and the comparator 25 for comparing the return address fetched from the outside at recursion with data held in the information saving unit 24 to generate the break when they coincided are included in the microprocessor 11, the break is effected easily by without decoding the program to search the subroutine call instruction, or placing the break instruction at that location, thus the debugging can be effected efficiently under a real time program control.

Next, the third invention of the microprocessor of the present invention is described.

Figure 15:
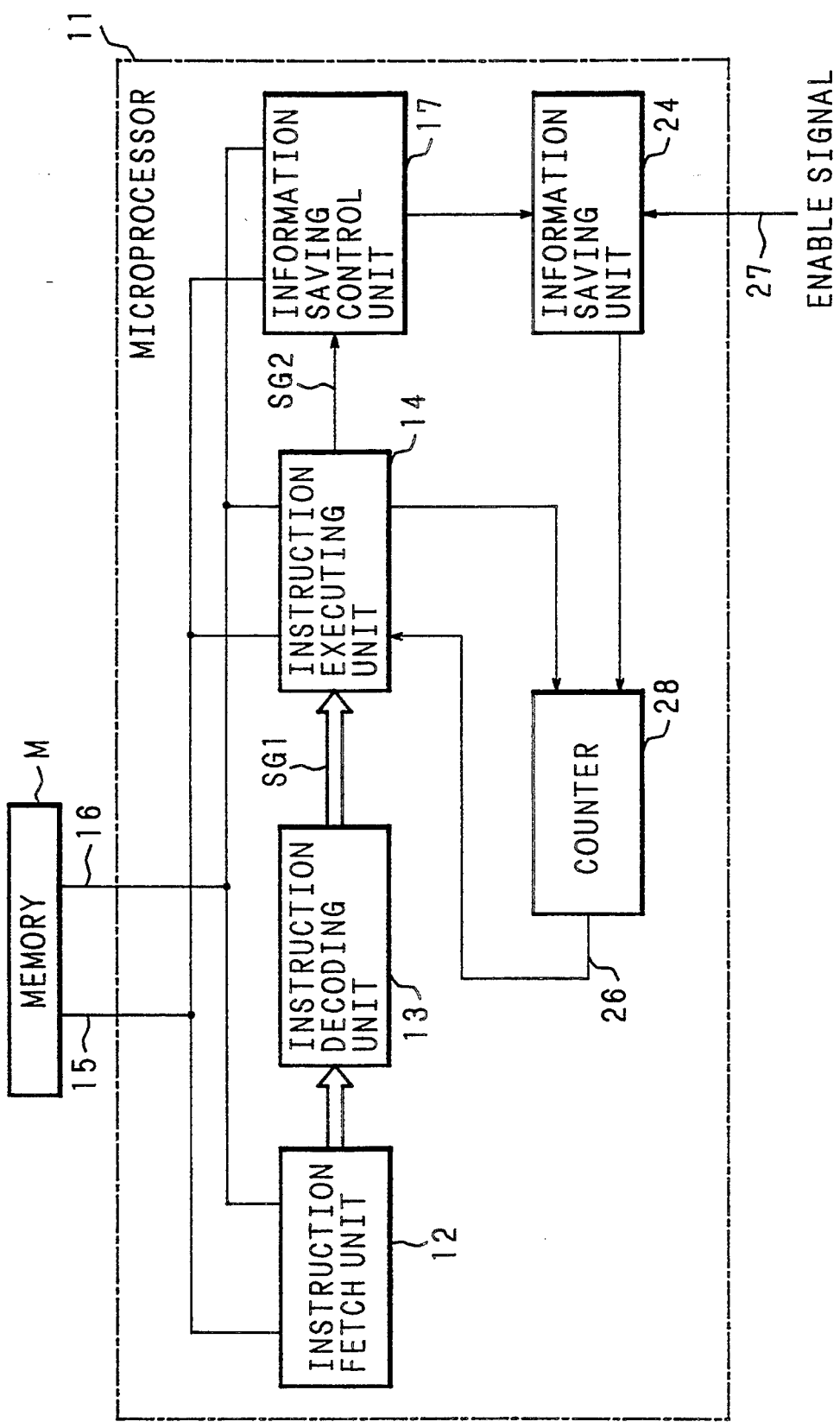
FIG. 15 is a block diagram showing a configuration of one embodiment of a third invention of a microprocessor of the present invention.

FIG. 15 is a block diagram showing a configuration of one embodiment of the third invention of the microprocessor of the present invention. In FIG. 15, the same reference characters in FIG. 1 which were referred to in the description of the aforementioned conventional example, and those in FIG. 10 and FIG. 13 which were referred to in the first and second inventions designate the same or corresponding parts.

A difference between the microprocessor of the third invention shown in FIG. 15 from the microprocessor of the second invention shown in FIG. 12 is that, in place of the comparator 19 in the second invention, a counter 28 is included in the third invention.

The counter 28 compares data held in the information saving unit 24, and the return address saved in the memory M outside the microprocessor 11 and fetched at execution of the return address represented by the subroutine return instruction, to decrement its own count value when they coincide. The counter 28 outputs the break signal 26 at the time point when the count value becomes 0 by repetitive decrements. When the break signal 26 is outputted from the counter 28, the microprocessor 11 breaks program execution for exclusive break processing.

The operation of the microprocessor of the third invention as stated above is described.

Figure 16:
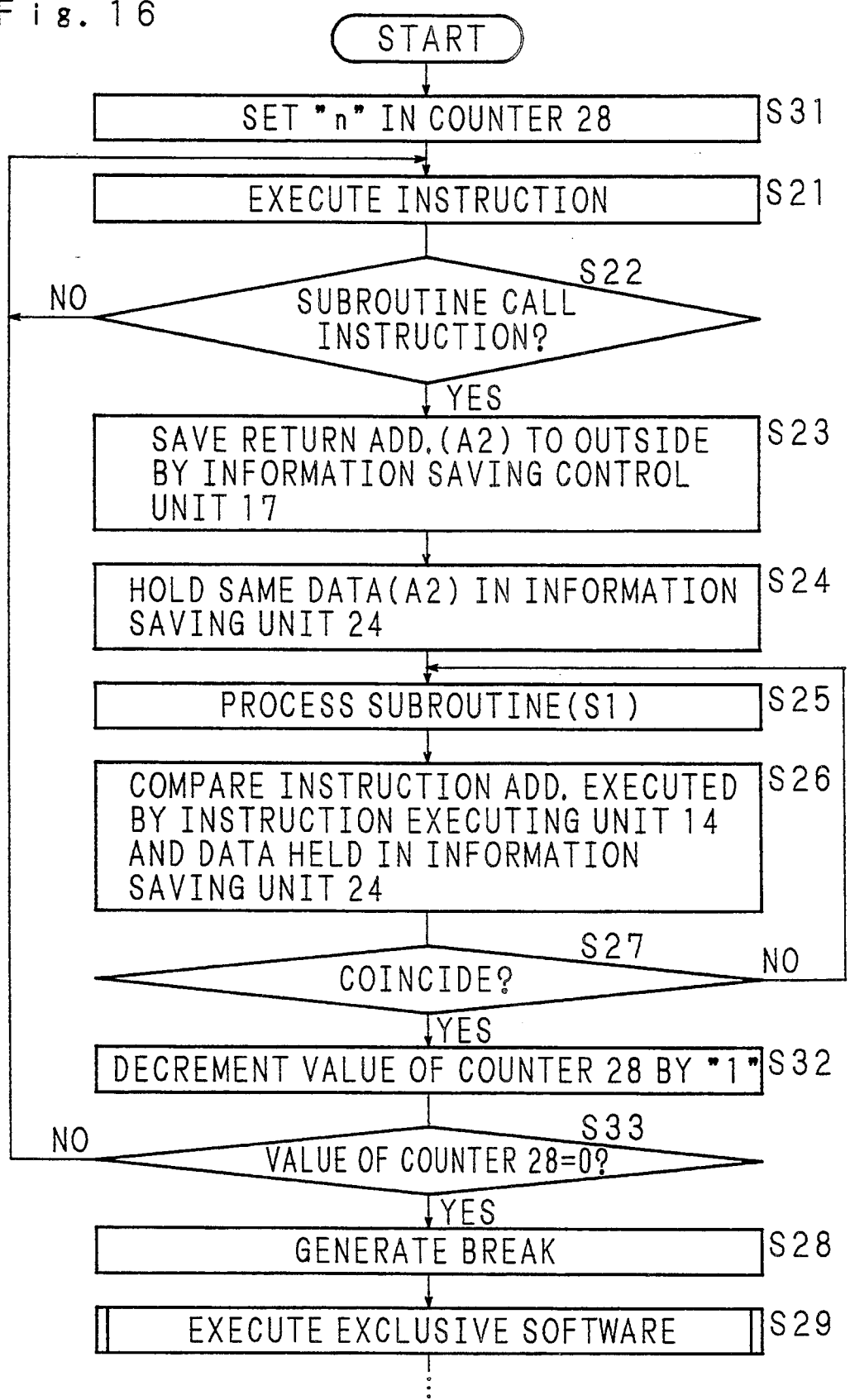
FIG. 16 is a flow chart showing procedures done by a third microprocessor of the present invention, for breaking in a unit of subroutine to break the processing temporarily, when a subroutine call instruction which is one of non-consecutive instructions is executed.

FIG. 16 is a flow chart showing processing procedures by the microprocessor of the present invention for breaking in a unit of subroutine when executing the subroutine call instruction which is one of the non-consecutive instructions, to break the processing temporarily. A storing state on the memory M of the instruction to be executed is same as that shown in FIG. 5.

In the flow chart shown in FIG. 16, the enable signal 27 is always kept active.

Meanwhile, in FIG. 16, steps designated by the same step numbers as the flow chart shown in FIG. 14, show the same processings.

The case where the break is generated at the time point when the subroutine is passed by "n" times is described. In this case, "n" is set in the counter 28 as an initial value of a count value (Step S31).

The instruction executing unit 14 executes successively from the instruction D1 stored in the address A1 shown in FIG. 5 (steps S21, S22). By executing the subroutine call instruction D1 which is the non-consecutive instruction stored in the address A1, the address A2, in which the instruction D2 next to the instruction D1 is stored, is saved in the memory M outside the microprocessor 11 by the information saving controlling unit 17 (Step S23). Simultaneously, data called the address A2 is held in the information saving unit 24 (Step S24).

Next, instruction execution is moved to the subroutine S1 and the instruction S1D1 stored in the head address S1A1 is executed successively (Step S25). At this time, data A2 held in the information saving unit 24 is always compared with an address value of the instruction executed in the instruction executing unit 14 thereafter (Step S26). As long as the comparison result is not coincided, the instruction executing unit 14 proceeds instruction execution one after another.

When the instruction executing unit 14 executes the subroutine return instruction S1D2 which is one of the non-consecutive instruction stored in the address S1A2, the address A2 saved to the outside as the address of the instruction to be executed next is fetched into the instruction executing unit 14 and outputted to the counter 28. Thereafter, though the instruction stored in the next address A2 must be executed, at this time point, a coincidence is detected by the continued comparison processing (Step S27). Thereby, the counter 28 decrements its own count value by "1" (Step S32). As a result, when the count value of the counter 28 becomes "0" (Step S33), the break is generated and the break signal 26 is given to the instruction executing unit 14 from the counter 28, so that the instruction of the address A2 is not executed and control is given to an exclusive software (Step S29).

When the count value of the counter 28 is not in "0" in Step S33, processing is returned to Step S21 and the instruction stored in the next address A2 is executed. The same operation is repeated hereinafter till the count value of the counter 28 becomes "0".

By the above-mentioned procedures, when "1" is set in the counter 28 as initial value, for example, only execution of subroutine instruction groups (D1, S1), is realized, and thereafter, the exclusive software is executed.

When "n" is set in the counter 28 as the initial value, for example, only n times executions of the subroutine instruction groups are realized, and thereafter, the exclusive software is executed.

In the above-mentioned third invention of the microprocessor of the present invention, though the case where the enable signal 27 is always active is shown, in the case of decrementing the count value or realizing the break by executing a certain specific non-consecutive instruction when a plural number of non-consecutive instructions represented by the subroutine call instruction are present, the time point of generating the break can be selected when the enable signal 27 is set active only at execution of the non-consecutive instructions. Particularly, when the enable signal 27 is set so as to become active only in the case of executing the non-consecutive instruction in a certain specific program area, the debug can be executed only in the specific program.

In the above-mentioned embodiment, though a generating process of a break associated with an address saved by execution of the subroutine call instruction and the subroutine return instruction is shown, since the generation of the break at the time of returning from a break processing can be controlled by the same process even at execution of the instruction showing a discontinuity such as the break processing generally used as an urgent processing of the microprocessor, an entry time of an unpredictable asynchronous processing can be detected.

It will be appreciated that the third invention of the microprocessor of the present invention as described above can also be applied in the processor of the microprogram system.

As stated above, in the third invention of the microprocessor of the present invention, since the information saving unit 24 for holding therein the same data as the address which is to be saved to the outside when executing the non-consecutive instruction and a readable/writable counter 28 which compares the address fetched from the outside at recursion with data held in the information saving unit 24, and when they coincide, decrements its own count value, and generates the break signal 26 when a specific count value is obtained, are included in the microprocessor 11, the break is effected easily without decoding the program to search the subroutine call instruction or placing the break instruction at that location, thus the debugging can be effected efficiently under the real time program control.

Next, the fourth invention of the microprocessor of the present invention is described.

FIG. 17 is a block diagram showing a configuration of one embodiment of the fourth invention of the microprocessor of the present invention. In FIG. 17, the same reference characters in FIG. 1 which were referred to the description of the aforementioned conventional example, and those of FIG. 10, FIG. 13 and FIG. 15 which were referred to the description of the first, second and third inventions designate the same and corresponding parts.

A difference between the fourth invention shown in FIG. 17 from the first invention shown in FIG. 10 is that, a break circuit 29 is included.

The break circuit 29 becomes active by a control signal SG4 given from the information saving controlling unit 17, only when an enable signal 27 is active and information is saved by the information saving controlling unit 17. The break signal 26 is enabled when the break circuit 29 becomes active. When the break signal 26 is enabled, the microprocessor 11 breaks execution of the program for exclusive break processing.

Next, the operation of the above-mentioned microprocessor of the fourth invention is described.

FIG. 18 is a flow chart explaining procedures by the present invention for temporarily breaking the processing by breaking at an entrance of a subroutine when the subroutine call instruction which is one of the non-consecutive instructions is executed. A storing state on the memory M of the instruction to be executed is same as that shown in FIG. 9.

In the flow chart shown in FIG. 18, the enable signal 27 is always kept active.

Figure 9:
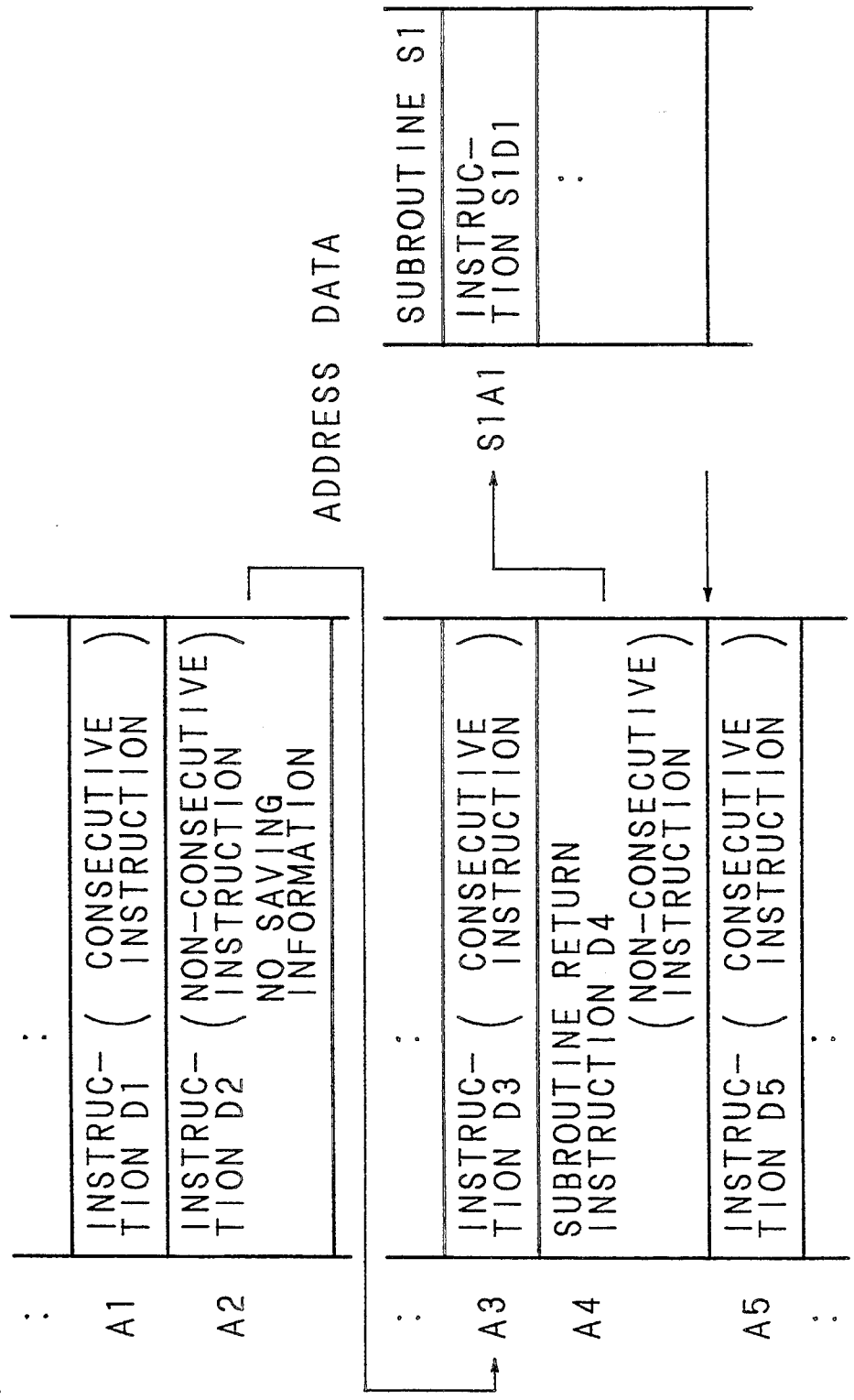
FIG. 9 is a schematic view showing an example of storing state on a memory outside a microprocessor of instructions executed by the microprocessor.

The instruction executing unit 14 executes instructions successively from the instruction D1 stored in the address A1 shown in FIG. 9 (Step S41). Then, it is judged whether or not the respective instructions are the consecutive instructions when executing the instructions (Step S42). When it is the consecutive instruction, the instruction executing unit 14 executes the next instruction. When it is not the consecutive instruction, it is judged whether or not the information save follows when executing the instruction, by the controlling signal SG4 outputted from the information saving controlling unit 17 (Step S43), and when the instruction is not followed by the information save, the instruction executing unit 14 executes the next instruction.

Thus, in the example shown in FIG. 9, the instruction D1 stored in the address A1 is the consecutive instruction, the instruction D2 stored in the address A2 is the non-consecutive instruction but is not followed by the information save, and the instruction D3 stored in the address A3 is the consecutive instruction, so that the instructions D1, D2 and D3 are executed successively.

When it is judged in Step S43 that the instruction executed by the instruction executing unit 14 is the instruction followed by the information save, in other words, when the control signal SG4 is outputted to the break circuit 29 from the information saving controlling unit 17, the break circuit 29 generates the break signal 26 (Step S44). Thereby, the instruction of the address A2 is not executed and control is given to the exclusive software (Step S45).

Thus, since the instruction D4 stored in the address A4 is the non-consecutive instruction followed by the information save, specifically, the subroutine call instruction, information is saved by its execution and the break circuit 29 enables the break signal 26. Thereby, the instruction executing unit 14 breaks execution of the program and executes the exclusive software or the break processing program.

In a manner described above, the program is executed till just before the instruction S1D1 at an entrance of the subroutine S1 stored in the address S1A1.

In the above-mentioned embodiment of the fourth invention of the microprocessor of the present invention, through the case where the enable signal 27 is always active is shown, in case of decrementing the count value or realizing the break by executing a certain specific non-consecutive instruction when a plural number of non-consecutive instructions represented by the subroutine call instruction are present, the time point of generating the break can be selected when the enable signal 27 is set active only at execution of the certain non-consecutive instruction.

It will be appreciated that the above-mentioned fourth information of the microprocessor of the present invention can also be applied to the processor of the microprogram system.

As stated above, in the fourth invention of the microprocessor of the present invention, since the break circuit 29 which generates the break signal 26 only when the information saving controlling unit 17, which controls to save information to the outside as the instruction is executed, is operated when executing the non-consecutive instruction represented by the subroutine call instruction, and the enable signal 27 for designating whether or not to enable the break signal 26 generated by the break circuit 29 are included in the microprocessor 11, the break can be easily effected without decoding the program to search the subroutine call instruction or placing the break instruction at that location, thus the debugging can be effected efficiently under the real time program control.

As particularly described heretofore, in the first invention of the microprocessor of the present invention, since the instruction decoding unit which can control to break the program being executed at that time point when fetching and decoding the subroutine call instruction, is provided in the microprocessor, the break can be effected easily by the subroutine call instruction without decoding the program to search the subroutine call instruction or placing the break instruction at that location, thus the debugging can be effected efficiently under the real time program control.

In the second invention of the microprocessor of the present invention, since the information saving unit for holding the same data as the address which is to be saved to the outside when executing the non-consecutive instruction therein and the comparator for comparing the return address fetched from the outside at recursion with data held in the information saving unit to generate the break signal when they coincide, are included in the microprocessor, the break is effected easily without decoding the program to search the subroutine call instruction, or placing the break instruction at that location, thus the debugging can be effected efficiently under the real time program control.

Furthermore, in the third invention of the microprocessor of the present invention, since the information saving unit for holding therein the same data as the address which is to be saved to the outside when executing the non-consecutive instruction, and a readable/writable counter which compares the address fetched from the outside at recursion with data held in the information saving unit and when they coincide, decrements its own count value and generates the break signal when a specific count value is obtained, are provided in the microprocessor, the break is effected easily without decoding the program to search the subroutine call instruction or placing the break instruction at that location, thus the debugging can be effected efficiently under the real time control.

Still further, in the fourth invention of the microprocessor of the present invention, break circuit which generates the break signal only when the information saving controlling unit which controls to save information to the outside as the instruction is executed, is operated when executing the non-consecutive instruction represented by the subroutine call instruction, and the enable signal for designating whether or not to enable the break signal generated by the break circuit, are included in the microprocessor, the break can be easily effected without decoding the program to search the subroutine call instruction or placing the break instruction at that location, thus the debugging can be effected efficiently under the real program control.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A microprocessor, comprising:
   instruction fetching means for fetching respective instruction of an instruction set including a subroutine call instruction and a trap instruction from external storing means;
   instruction decoding means for decoding the instruction fetched into said instruction fetching means, and outputting an internal signal responding to a decoded result;
   instruction executing means for executing the instruction according to the internal signal outputted from said instruction decoding means; and
   mode setting means for setting either a first mode in which the trap instruction is not executed, or a second mode in which the trap instruction can be executed;
   wherein said instruction decoding means,
      in case where said first mode is set in said mode setting means, outputs the internal signal directing execution of a subroutine call to said instruction executing means when decoding the subroutine call instruction, and in case where said second mode is set in said mode setting means, outputs the internal signal directing execution of a trap to said instruction executing means when decoding the subroutine call instruction.

2. A microprocessor, comprising:

instruction fetching means for fetching respective instructions of an instruction set including a subroutine call instruction and a trap instruction from external storing means;

instructions decoding means for decoding the instruction fetched into said instruction fetching means, and outputting a microprogram address responding to the decoded result as an internal signal;

microprogram storing means for storing the microprogram responding to the respective instructions of said instruction set;

instruction executing means for executing the microprogram stored in an address of said microprogram storing means designated by the internal signal outputted from said instruction decoding means; and mode setting means for setting either a first mode in which the trap instruction is not executed, or a second mode in which the trap instruction can be executed;

wherein said instruction decoding means, in case where said first mode is set in said mode setting means, outputs to said microprogram storing means the internal signal directing the address of the microprogram executing a subroutine call when decoding the subroutine call instruction, and in case where said second mode is set in said mode setting means, outputs to said microprogram storing means the internal signal directing the address of the microprogram executing a trap when decoding the subroutine call instruction.

3. A microprocessor, comprising:

instruction fetching means for fetching respective instructions of an instruction set including a first kind of instruction executing non-consecutive processing and a second kind of instruction executing consecutive processing from external storing means;

instruction decoding means for decoding the instructions fetched into said instruction fetching means, and outputting an internal signal responding to the decoded result;

instruction executing means for executing the instructions according to the internal signal outputted from said instruction decoding means, and information saving controlling means for, when an instruction fetched by said instruction fetching means is said first kind of instruction, controlling to save information necessary for executing said first or second instruction succeeding said fetched instruction in the external storing means;

further comprising:

saved information holding means for holding same information as that saved in the external storing means by said information saving controlling means; and comparing means for comparing information fetched from the external storing means to execute the instruction succeeding said first kind of instruction by said instruction executing means with information saved in said saved information holding means, and for, when the comparing result by said comparing means coincides, making said instruction executing means break all subsequent processings without executing the instruction succeeding said first kind of instruction.

4. A microprocessor as set forth in claim 3, further comprising:

selecting means for selecting whether to operate said saved information holding means or not.

5. A microprocessor, comprising:

instruction fetching means for fetching respective instructions of an instruction set including a first kind of instruction executing non-consecutive processing and a second kind of instruction executing consecutive processing from external storing means;

instruction decoding means for decoding the instructions fetched into said instruction fetching means, and outputting an internal signal responding to the decoded result;

instruction executing means for executing the instruction according to the internal signal outputted from said instruction decoding means, and information saving controlling means for, when an instruction fetched by said instruction fetching means is said first kind of instruction, controlling to save information necessary for executing said first or second instruction succeeding said fetched instruction in the external storing means;

further comprising:

saved information holding means for holding same information as that saved in the external storing means by said information saving controlling means; and counting means for, in which any initial value is set as a count value, for down counting own count value when comparing result of information fetched from the external storing means to execute the instruction succeeding said first kind of instruction by said instruction executing means with information saved in said saved information holding means are coincided, and for, when the count value becomes a predetermined value, making said instruction executing means break all subsequent processings without executing the instruction succeeding said first kind of instruction.

6. A microprocessor as set forth in claim 5, further comprising:

selecting means for selecting whether to operate said saved information holding means or not.

7. A microprocessor, comprising:

instruction fetching means for fetching respective instructions of an instruction set including a first kind of instruction executing non-consecutive processing and a second kind of instruction executing consecutive processing from external storing means;

instruction decoding means for decoding the instructions fetched into said instruction fetching means, and outputting an internal signal responding to the decoded result;

instruction executing means for executing the instruction according to the internal signal outputted from said instruction decoding means, and information saving controlling means for, when an instruction fetched by said instruction fetching means is said first kind of instruction, controlling to save information necessary for executing said first or second kind of instruction succeeding said fetched instruction in the external storing means;

further comprising:

breaking means for breaking all subsequent processings only when said information saving means saves information in the external storing means.

8. A microprocessor as set forth in claim 7, further comprising:

selecting means for selecting whether to operate said holding means or not.

* * * * *